(12) United States Patent
Black

(10) Patent No.: US 6,373,866 B1
(45) Date of Patent: Apr. 16, 2002

(54) SOLID-STATE LASER WITH COMPOSITE PRISMATIC GAIN-REGION

(75) Inventor: John F. Black, San Mateo, CA (US)

(73) Assignee: Lumenis Inc., Santa Clara, CA (US)

( * ) Notice: Subject to any disclaimer, the term of this patent is extended or adjusted under 35 U.S.C. 154(b) by 0 days.

(21) Appl. No.: 09/492,025

(22) Filed: Jan. 26, 2000

(51) Int. Cl.⁷ .................................................. H01S 3/11

(52) U.S. Cl. .............................. 372/16; 372/16; 372/66; 372/100; 372/39; 372/71; 372/72

(58) Field of Search .............................. 372/66, 39, 71, 372/72, 16, 100, 60, 64; 359/669, 625, 831

(56) References Cited

U.S. PATENT DOCUMENTS

| | | | | |
|---|---|---|---|---|
| 4,912,713 A | * | 3/1990 | Langhans | 372/66 |
| 5,235,610 A | | 8/1993 | Finch et al. | 372/92 |
| 5,249,196 A | | 9/1993 | Scheps | 372/93 |
| 5,553,093 A | * | 9/1996 | Ramaswamy et al. | 372/100 |
| 5,748,664 A | | 5/1998 | Dunn et al. | 372/75 |
| 5,872,804 A | | 2/1999 | Kan et al. | 372/93 |

OTHER PUBLICATIONS

M.J. Shoup III, J.H. Kelly & D.L. Smith, "Design and testing of a large-aperture, high-gain, Brewster's angle zigzag Nd:glass slab amplifier," *Applied Optics*, Aug. 20, 1997, vol. 36, No. 24, pp. 5827–5838.

D. Mudge, P.J. Veitch, J. Munch, D. Ottaway & M.W. Hamilton, "High–Power Diode–Laser–Pumped CW Solid–State Lasers Using Stable–Unstable Resonators," *IEEE Journal of Selected Topics in Quantum Electronics*, vol. 3, No. 1, Feb. 1997, pp. 19–25.

K. Du, N. Wu, J. Xu, J. Giesekus, P. Loosen & R. Poprawe, "Partially end–pumped Nd:YAG slab laser with a hybrid resonator," *Optics Letters*, vol. 23, No. 5, Mar. 1, 1998, pp. 370–372.

D. Barry Coyle, "Alternating–Precessive–Slab Laser Preamplifier (The size and the number of components would be minimized)," *NASA Tech Brief*, Jul. 1997, p. 52.

\* cited by examiner

*Primary Examiner*—Frank G. Font
*Assistant Examiner*—Delma R. Flores Ruiz
(74) *Attorney, Agent, or Firm*—Eitan, Pearl, Latzer & Cohen-Zedek

(57) ABSTRACT

A slab laser includes a laser-resonator and a plurality of generally-triangular prismatic slabs of a solid-state gain-medium located in the resonator. The prismatic slabs are cooperatively arranged such that laser-light circulating in the laser-resonator follows a convoluted path through the prismatic slabs. Each of the prismatic slabs changes the direction of the convoluted path at least once by about one-hundred-eighty degrees.

31 Claims, 10 Drawing Sheets

SOLID-STATE LASER WITH COMPOSITE PRISMATIC GAIN-REGION

TECHNICAL FIELD OF THE INVENTION

The present invention relates in general to lasers having a solid-state gain-region in the form of planar-sided slab of a gain-material or gain-medium. The invention relates in particular to a solid-state laser including a resonator having a gain-region including two or more prismatic slabs of a gain-medium, the slabs are cooperatively arranged such that light circulating in the resonator follows an extended convoluted path through the prismatic slabs.

DISCUSSION OF BACKGROUND ART

Solid-state lasers having a gain-region in the form of a slab of gain-medium are generally referred to as slab lasers. The slab-like form of the gain-medium is particularly suited for optical pumping by one or more diode-laser arrays. In one common form, the gain-medium is in the form of an elongated parallelepiped or rhomb. Pump-light from one or more diode-laser arrays is directed through lateral faces of the gain-medium. The gain-medium is arranged in a laser-resonator, and end-faces thereof are configured such that laser-light circulating in the resonator follows a zigzag path through the gain-medium. Examples of this type of arrangement are disclosed in U.S. Pat. Nos. 5,235,610; 5,748,664; and 5,872,804. One shortcoming of these, and other zigzag arrangements, is that a significantly larger volume of the gain-medium is optically pumped than the volume of the gain-medium from which laser-light is extracted. This can present a problem in causing excessive heating of the gain-medium and waste of pump-light power. This especially true in three-level systems where the excess of pumped gain-medium behaves as an absorbing aperture.

This particular problem is avoided by an alternative arrangement, disclosed in U.S. Pat. No. 5,249,196. Here a gain-medium is in the form of a pentaprism. One of two faces of the pentaprism subtending a ninety-degree angle is used as a end-reflector of a laser-resonator. An external mirror, facing the other of the two ninety-degree faces provides the other end-reflector of the laser-resonator and is used as an output-coupling mirror. Diode-laser pumping is arranged from multiple diode-laser sources arranged around three reflecting faces of the pentaprism such that pump-light is directed into the pentaprism along all (three) legs of a folded path followed by laser-light circulating within the pentaprism, but only along those legs.

A problem common to both the above-described zigzag and pentaprism arrangements of gain-media and associated resonators is that only a relatively small proportion of the volume of a gain-medium is traversed by laser-light circulating in the resonators. This proportion is often referred to by practitioners of the art as a "fill-factor". In such arrangements, scaleability to higher laser power may be limited by the availability of boules or blanks of gain-medium of sufficient size and optical quality.

One solution to this fill-factor problem is proposed in a paper "Alternating-Precessive-Slab Preamplifier", NASA Tech Briefs, July 1997, page 52. Here a slab of gain-medium for a laser preamplifier has a basically square shape with two adjacent corners thereof truncated at forty-five degrees to lateral faces of the square slab. One of the truncated faces serves as an entrance face and the other as an exit face. Light entering the entrance face at normal incidence thereto undergoes a succession of 90 degree internal reflections from the lateral faces of the slab and eventually leaves the slab via the truncated exit face at normal incidence thereto. The path of light in the slab can be described as a convoluted path having a plurality of parallel longitudinal and transverse legs orthogonal to each other and at forty-five degrees to lateral faces of the slab.

A disadvantage of this arrangement, and many other slab arrangements, is the angular relationship of all faces of the slab with each other must be controlled with relatively high precision. This adds considerably to be difficulty and expense of making such slabs. There is a need for a slab laser gain-medium arrangement which offers a high fill factor, extensive scaleability without a requirement for expensive gain-medium components.

SUMMARY OF THE INVENTION

In one general aspect, a slab laser in accordance with the present invention includes a laser-resonator and a plurality of generally-triangular prismatic slabs of a solid-state gain-medium located in the resonator. The prismatic slabs are cooperatively arranged such that laser-light circulating in the laser-resonator follows a convoluted path through the prismatic slabs. Preferably each of the prismatic slabs changes the direction of the convoluted path at least once by about one-hundred-eighty degrees (180°).

In one particular aspect, a slab laser in accordance with the present invention comprises a laser resonator having a gain-region located therein. The gain-region includes at least two prismatic slabs including a solid-state gain-medium. Each of the prismatic slabs has two reflecting faces subtending an angle of ninety degrees and at least a first entrance-exit face. The first entrance-exit face faces the reflecting faces within the angular subtense thereof and is inclined at forty-five degrees thereto. The entrance-exit face has a length longer than the length of the longest of the reflecting faces. The prismatic portions are cooperatively arranged such that laser-light circulating in the laser-resonator follows a first convoluted path through the gain-region. The first convoluted path includes a plurality of spaced-apart parallel longitudinal legs, adjacent ones thereof being connected by a corresponding transverse leg at ninety degrees thereto. The longitudinal and transverse legs are inclined at forty-five degrees to the reflecting faces.

In one embodiment of the inventive laser, the laser-resonator is terminated by first and second mirrors and the laser-light circulates in the laser-resonator between the first and second mirrors. The first and second mirrors are arranged such that the circulating laser-light follows the first convoluted path in opposite directions of travel between the first and second mirrors.

In another embodiment of the inventive laser the laser-resonator is terminated by first and second mirrors and the laser-light circulating in the laser-resonator circulates between the first and second mirrors. A prism is positioned at a mid-point in the laser-resonator to reflect the circulating laser-light. The prism has first and second reflective surfaces at an angle of forty-five degrees to each other. The first and second mirrors and the prism are arranged such that the circulating laser-light follows the first convoluted path through the gain-region in travelling from the first mirror to the prism, and follows a second convoluted path through the gain-region in traveling from the prism to the second mirror. The second convoluted path is spaced apart from and parallel to the first convoluted path.

In yet another embodiment of the inventive laser the laser-resonator is terminated by a mirror and prism having first and second reflective faces at an angle of forty-five degrees to each other. The mirror and the prism are arranged such that the circulating laser-light follows the first convoluted path in traveling from the mirror to the prism, and a second such convoluted path in traveling from the prism to the mirror. The first and second convoluted paths are overlapping and parallel to each other.

In all preferred embodiments of the inventive laser, the prismatic slabs are optically-pumped by pump-light optically delivered from a diode-laser array through one of the reflecting-faces thereof. Optical delivery may take place via a cylindrical lens for reducing the divergence of light from the diode-laser array in a fast-axis thereof. Optical delivery may also take place via a tapered optical-waveguide for concentrating light from a diode-laser array having emitting-aperture dimensions larger than the reflecting-face. One or more of the prismatic slabs may be clad on upper and lower opposite lateral faces thereof with a material transparent to the laser-light and the pump-light, and having a lower refractive index than the refractive index of the gain-medium.

A preferred general form of the prismatic gain-medium slabs may described as being generally-triangular. The terminology generally-triangular is intended to cover a true (three-cornered) isosceles triangular form wherein two reflecting faces of equal length connect to form what may be described as an apex-corner of the slab, and the two reflecting faces connect with the first entrance-exit or hypotenuse face to form what may be described as hypotenuse-corners of the slab. The terminology generally-triangular is also intended to cover prismatic slabs having the apex-corner truncated to form a second entrance-exit face between the reflecting faces and parallel to the first entrance-exit face, and additionally or separately, having one or both of the hypotenuse-corners truncated.

The prismatic slab form of the gain-medium, which is a feature of all inventive lasers described herein is particularly suitable for cooling the gain-medium by conduction through lateral faces of the slab. This allows cooling to cryogenic temperatures. This provides a particular benefit in using quasi three-level gain-medium systems, the performance of which improves with decreasing temperature. Such systems include the gain-media Yb:YAG, Tm:YAG, Tm:Ho:YAG, CTH-YAG, Ho:YLF, Tm:YLF, and Tm:YALO.

Using two or more prismatic gain-medium slabs has cost and manufacturing advantages over prior art slab lasers including a single monolithic slab. This results from fabrication and alignment tolerances of the prismatic slabs of gain-medium being generally looser and material costs generally less than for a single monolithic slab providing an equivalent path-length through the gain-medium. Cost advantages realized will be dependent, inter alia, on the size of the slab and the particular gain-medium.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
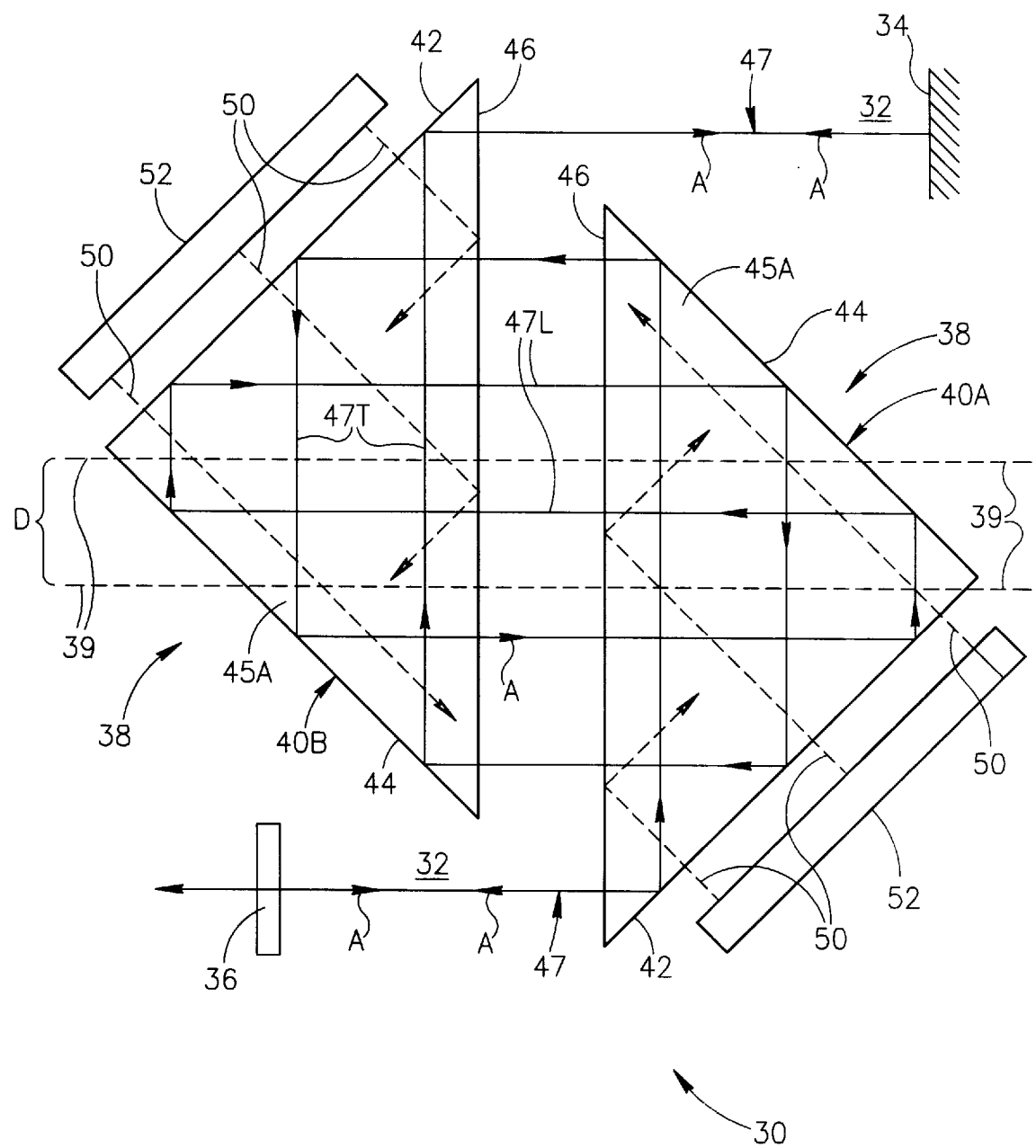
FIG. 1 is a plan view schematically illustrating a first preferred embodiment of a slab laser in accordance with the present invention having a resonator including two triangular prismatic slabs of gain-medium optically pumped by diode-laser bars.

Turning now to the drawings, wherein like features are designated by like reference numerals, FIG. 1 schematically illustrates a first preferred embodiment 30 of a slab-laser in accordance with the present invention. Laser 30 includes a laser-resonator 32 formed between (terminated by) a highly reflecting mirror 34 and a partially transmitting, output-coupling mirror 36. Located within laser-resonator 32 is a gain-region 38. Gain-region 38 includes two triangular prismatic slabs 40, formed from a solid-state gain-medium, and here designated individually as slabs 40A and 40B. Each of prismatic slabs 40A and 40B includes first and second faces 42 and 44 respectively. Faces 42 and 44 are of equal length, accordingly the term "triangular" as applied to prismatic slabs 40 in this and other embodiments of the inventive laser described herein refers to an isosceles triangle.

Faces 42 and 44 subtend an angle of ninety degrees, i.e., are at a right-angle to each other. The right-angle is not explicitly designated in FIGS. 1 and 2, in order to avoid confusion, but is clear from the illustration. Within the angular-subtense of faces 42 and 44 is a third face 46, arranged at forty-five degrees to faces 42 and 44 and (internally) facing faces 42 and 44. Slabs 40A and 40B are each symmetrical about an (optical) axis-of-symmetry 39, here designated correspondingly as axes 39A and 39B. Axis-of-symmetry 39 bisects the angle between faces 42 and 44 and is perpendicular to face 46.

Prismatic slabs 40A and 40B are arranged with faces 46 thereof spaced-apart, face-to-face and parallel to each other, with the axes-of-symmetry 39A and 39B of the prismatic slabs being laterally misaligned or offset by a distance D. The distance D can be varied to vary the number of total internal reflections (correspondingly the total path length of laser light in the prismatic slabs) and, accordingly the fill factor.

Figure 2:
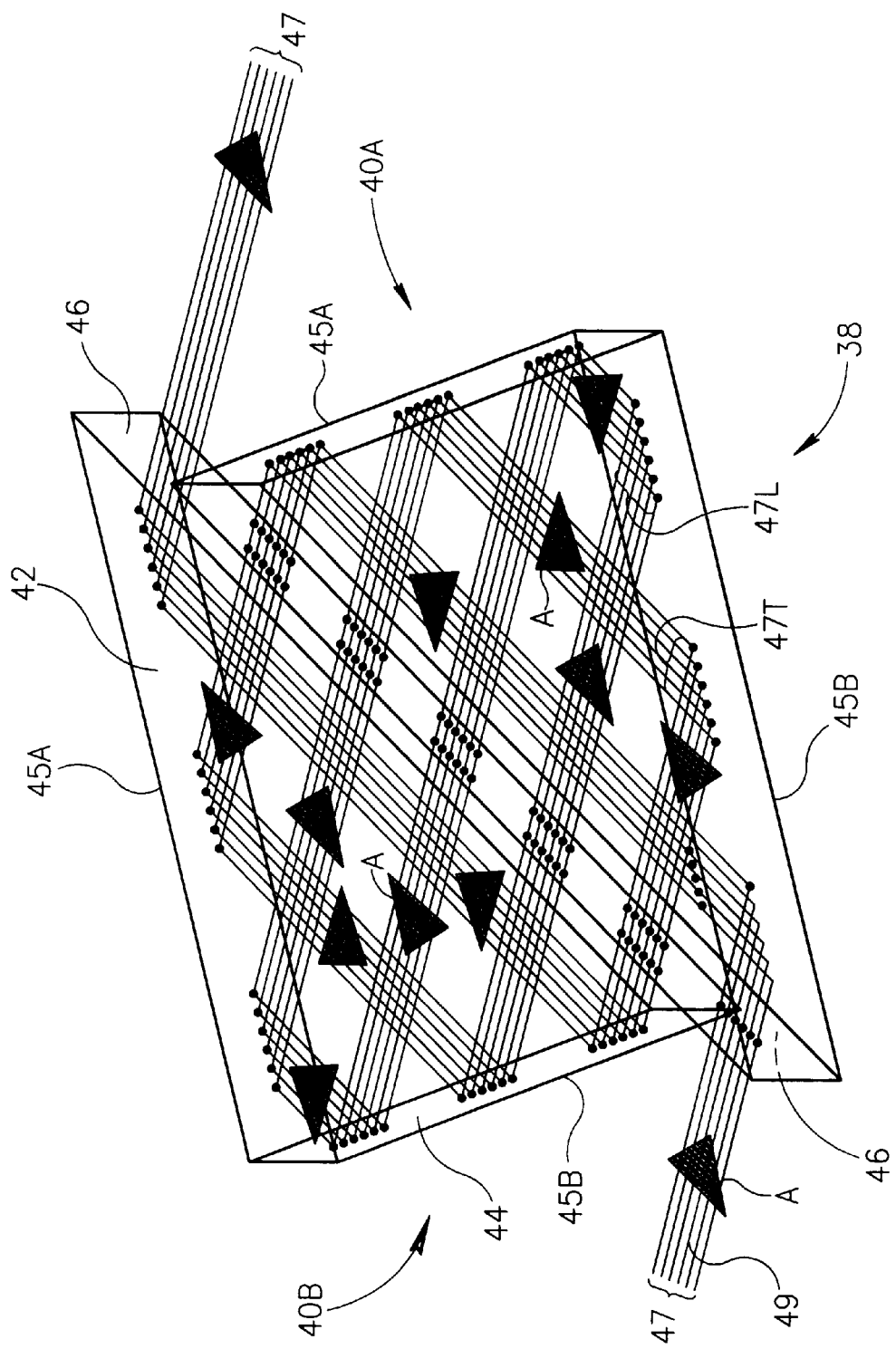
FIG. 2 is a perspective view schematically illustrating details of the prismatic gain-medium slabs of FIG. 1.

Laser-light circulates in laser-resonator 32 along a convoluted path 47 designated additionally by arrows A. In FIG. 1, only the direction of circulating laser-light is designated by a single line. In FIG. 2, circulating laser-light is depicted as a beam of finite dimensions formed by rays 49. Within prismatic slabs 40, the path-direction is designated in one direction (from mirror 36 to mirror 34) only for clarity. Those skilled in the art will recognize that, in laser 30, circulating laser-light follows the same path in both forward and reverse (outward and return) directions of circulation.

In one direction of travel, laser-light enters a prismatic slab 40A via face 46 at normal incidence (perpendicular or at a right-angle) thereto. The laser-light then undergoes successive ninety-degree reflections as a result of total internal reflection (TIR) from respectively faces 42 and 44 of slab 40A. The twice-reflected laser-light exits slab 40A via face 46 thereof, at normal incidence to face 46.

Faces 42 and 44 of prismatic slabs 40 may be conveniently designated reflecting-faces for circulating laser-light. Faces 46 of slabs 40 may be designated functionally (as far as laser-light is concerned) as entrance-exit faces, or, geometrically, as hypotenuse faces. Collectively, faces 42, 44 and 46 may be defined as peripheral faces of a slab 40.

After exiting slab 40A laser-light then enters a prismatic slab 40B via face 46 thereof at normal incidence thereto. The laser-light then undergoes successive ninety-degree reflections as a result TIR from respectively faces 42 and 44 of slab 40B. The twice-reflected laser-light exits slab 40B via face 46 thereof, at normal incidence to face 46.

The successive ninety-degree reflections of the laser-light continue (in order) from faces 42 and 44 of slab 40A; from faces 44 and 42 of slab 40B; from faces 44 and 42 of slab 40A; and from faces 44 and 42 of slab 40B. Following these successive ninety-degree reflections, the laser-light exits gain-region 38 via face 46 of slab 40B. As noted above, laser-light traveling from mirror 34 to mirror 36 will follow the instantly-described path in the reverse direction. The convoluted path of laser-light may be described as comprising a plurality of parallel longitudinal legs 47L, adjacent ones thereof being connected by a transverse leg 47T. The number of ninety-degree reflections, and accordingly the number of longitudinal and transverse legs of path 47 is determined by the distance D by which the axes-of-symmetry 39 are offset.

The gain-medium of prismatic slabs 40 is preferably optically-pumped through one of faces 42 and 44 of the slabs. In FIG. 1, slabs 40 are optically-pumped through faces 42 thereof by pump-light 50 from diode-laser bars 52. Faces 42 are preferably antireflection coated for the wavelength of the pump-light. Faces 44 are preferably coated for maximum reflection of pump-light.

Pump-light 50 entering a slab 40 in a direction at normal incidence to face 42 thereof will be absorbed by the gain-medium of the slab to an extent determined by the absorption-coefficient of the gain-medium. Doping of the gain-medium of slabs 40A and 40B is preferably selected such that 90 percent of pump-light is absorbed by the gain-medium in a path from entry into the slab, (total internal) reflection from face 46, the slab, reflection from face 44 of the slab, and reflection again from face 46 of the slab to face 42 of the slab.

As is known in the art to which the present invention pertains, a diode-laser bar includes a plurality of diode-laser emitters (not shown in FIG. 1) emitting light in the same general direction. The light from each emitter diverges weakly (for example, up to about sixteen degrees half-angle) in a slow-axis parallel to the diode-laser bar, and diverges strongly (for example, up to about forty-five degrees half-angle) in a fast-axis perpendicular to the slow axis.

A slab 40 made from a gain-medium having a YAG (yttrium aluminum garnet) crystalline host will accept light incident on face 42 at up to about 21.0 degrees, and still preserve TIR. This would allow the slab to capture more than ninety percent of light emitted in the slow-axis of a diode-laser bar without the aid of a lens or the like. A lens or the like would be necessary between diode-laser bar 52 and face 42 of the slab in order to capture the same percentage of light in the fast-axis of the diode-laser bar.

For simplicity, pump-light 50 from diode-laser bars 52 is illustrated as being injected directly into slabs 40. Those skilled in the art will recognize, however, that optical-delivery means such as lenses (refractive or diffractive) or optical-waveguides may be deployed between diode-laser bars 52 and slabs 40 without departing from the spirit and scope of the present invention.

Cooling of prismatic slabs 40 is preferably effected by contact cooling of upper and lower parallel triangular-faces (lateral faces) 45A and 45B thereof by thermally coupling these faces to a suitable heat-sink. Details of such contact cooling arrangements are well known to those skilled in the art and accordingly are not depicted in FIGS. 1 and 2. One disadvantage of such a cooling arrangement is that a thermal gradient and corresponding refractive index gradient is established in a slab in a direction perpendicular to the propagation direction of laser lens. Such a refractive index gradient can give rise to an undesirable cylindrical (uniaxial) thermal-lens effect in a resonator including such prismatic slabs. A prismatic slab arrangement for avoiding this problem is discussed with reference to other embodiments of the present invention described further hereinbelow.

Figure 3:
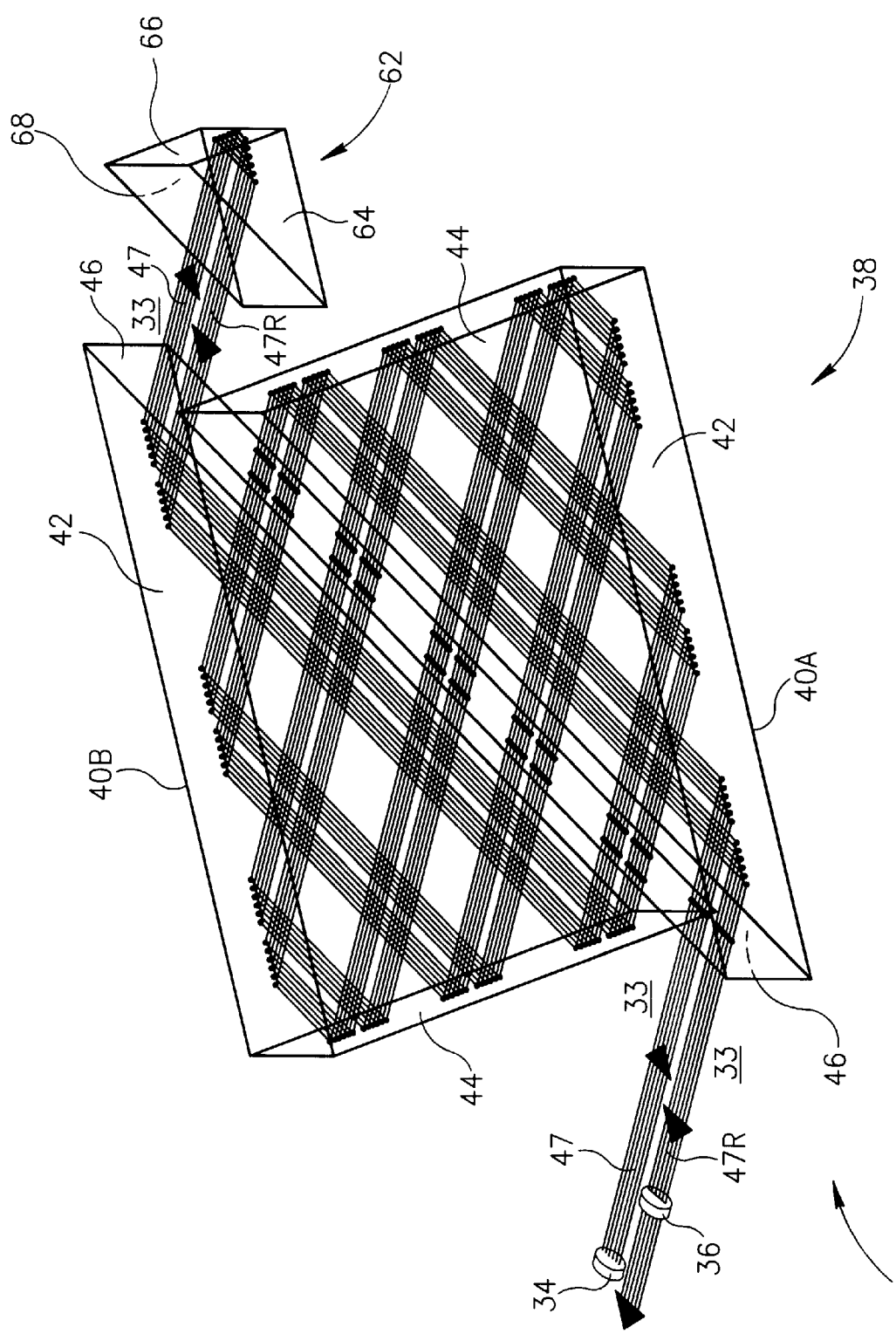
FIG. 3 is a perspective view, schematically illustrating a second preferred embodiment of a slab laser in accordance with the present invention having a resonator including two triangular prismatic slabs of gain-medium.

Referring now to FIG. 3, a second embodiment 60 of a laser in accordance with the present invention is illustrated. Laser 60 includes a gain-region 38, similar to gain-region 38 of laser 20, comprising prismatic gain-medium slabs 40A and 40B arranged as described above for slabs 40A and 40B of laser 20. A triangular prism 62, having reflective faces 64 and 66 at a right-angle to each other, and a hypotenuse face 68 at forty five degrees to faces 64 and 66, is arranged with hypotenuse face 68 thereof facing and parallel to face 46 of slab 40B. Maximally reflecting mirror 34 and output-coupling mirror 36 are directed toward face 46 of slab 40A. The mirrors terminate a resonator 33 which is folded or reflected back on itself by prism 62.

Those skilled in the art will recognize that prism 62 could be replaced, in theory at least, by an open-corner reflective device formed by reflective surfaces of individual mirrors inclined at forty-five degrees to each other. Those skilled in the art will also recognize, however, that a prism is usually preferred in such an application for reasons including ease of manufacture and stability of the angular relationship of reflecting surfaces. By way of example, commercial mass production technology for prisms having angular accuracy within less than 3.0 arc minutes (±3') is relatively well established. It should also be noted here that prism 62, or a like reflective device such as an open-corner reflector, can be considered as being located at a mid-point in resonator 33 as far as the total optical path length of the resonator is concerned.

Laser-light circulating in resonator 33, in traveling from mirror 34 to mirror 36, follows a convoluted path 47 through slabs 40A and 40B as described above with reference to laser 20. After exiting face 46 of slab 40B, the laser-light enters prism 62 via face 68 thereof, at normal incidence to face 68. Within prism 62, the laser-light undergoes successive ninety-degree reflections as a result of TIR from faces 66 and 64, and exits prism 62 via face 68 thereof at normal incidence thereto, on a path 47R parallel to but laterally displaced from path 47. The laser-light follows this parallel, displaced path 47 through slabs 40B and 40A, to mirror 36. While only one direction of travel between mirrors 34 and 36 is depicted in FIG. 3, it will be evident to one skilled in the art that light travelling from mirror 36 to mirror 32 will follow path 47R to prism 62, undergo successive reflections from faces 64 and 66 respectively of prism 62, and return along path 47 to mirror 34.

Laser 60 is useful, inter alia, for increasing the fill-factor in prismatic slabs 40A and 40B or for creating a longer (total) path for laser-light in the prismatic slabs. The arrangement of laser 60 also provides that a long resonator path can be achieved in a physical space which is relatively short compared with the resonator path length.

Figure 4:
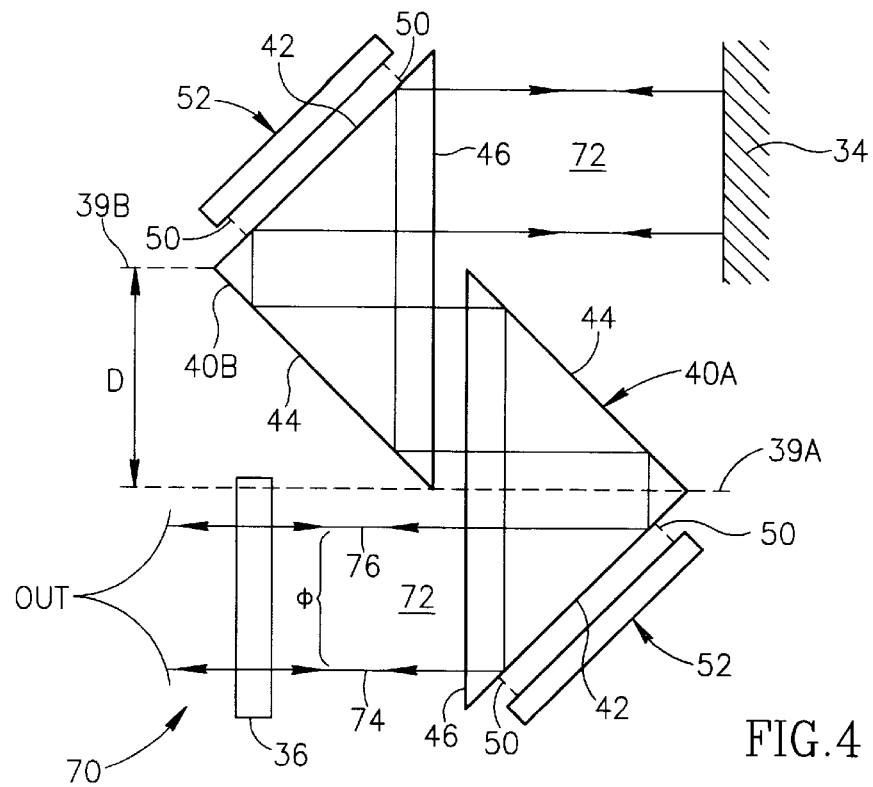
FIG. 4 is a plan view schematically illustrating a third preferred embodiment of a slab laser in accordance with the present invention having a resonator including two triangular prismatic slabs of gain-medium optically pumped by diode-laser bars.

Referring now to FIG. 4, a third embodiment 70 of a laser in accordance with the present invention is illustrated. Laser 70 has a resonator 72 terminated by maximally reflecting mirror 34 and output-coupling mirror 36. Laser 70 is arranged similarly to above-described laser 30 with the exception that dimensions of gain-medium slabs 40A and 40B, and the offset distance of the axes-of-symmetry of the slabs, are selected such that a beam of diameter φ, indicated by extreme rays 74 and 76 thereof, has only two longitudinal legs and one transverse leg in each slab. Extreme rays 74 and 76 circulating in resonator 72 each follow the same convoluted path in making a round-trip between maximally reflecting mirror 34 and output-coupling mirror 36.

Figure 5:
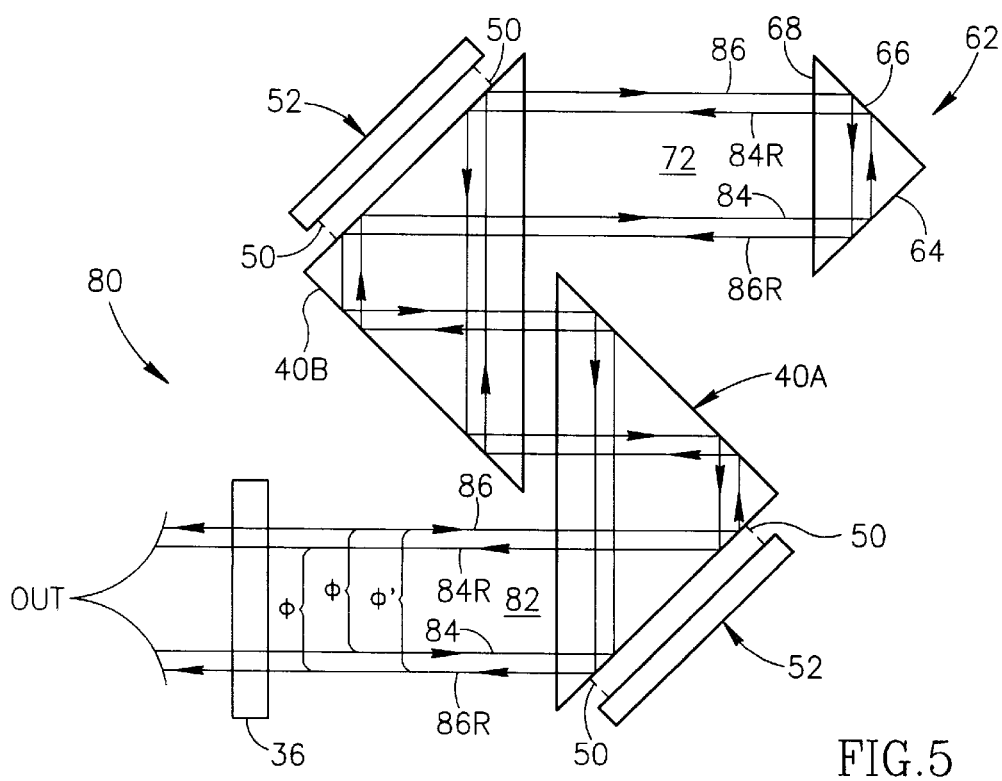
FIG. 5 is a plan view schematically illustrating a fourth preferred embodiment of a slab laser in accordance with the present invention having a resonator including two triangular prismatic slabs of gain-medium optically pumped by diode-laser bars.

Referring now to FIG. 5, a fourth embodiment 80 of a laser in accordance with the present invention is illustrated. Laser 80 has a resonator 72 terminated by a forty-five degree prism 62 and output-coupling mirror 36. Laser 80 is arranged similarly to above-described laser 30 with the exception that dimensions of gain-medium slabs 40A and 40B, and lateral displacement of one with respect to the other, are selected such that a beam of diameter φ, indicated by extreme rays 84 and 86 thereof, has only two longitudinal legs and one transverse leg in each slab. It should be noted, here again, that prism 62, in theory at least, could be replaced by an open-corner reflector, or like reflective device, as discussed above with reference to laser 60 of FIG. 3.

Extreme rays 84 and 86 circulating in resonator 72 each follow a first convoluted path in making a trip between output-coupling mirror 36 and 62, and return from prism 62 along a second convoluted path, parallel and spaced apart from the first convoluted path as designated by extreme rays 84R and 86R. Beams bounded by extreme rays 84 and 86, and 84R and 86R will proceed along overlapping parallel convoluted paths.

A substantial fraction of rays 84R and 86R (and intermediate rays, not shown) will, of course, be reflected from output-coupling mirror 36, will return to prism 62 along their return path, and will return from prism 62 to output-coupling mirror 36 along their original outward path from output-coupling mirror 36. A result of this circulation along overlapping paths in resonator 82 is that an elliptical mode having a minor axis of length φ and a major axis of length φ' will circulate in resonator 82. This provides another means of improving fill-factor in the gain-medium.

Embodiments of lasers in accordance with the present invention are described above in which two triangular slabs of gain-medium are used to provide optical gain. Lasers in accordance with the present invention are not limited however to the use of two such slabs but may include three or more arranged in what might be described as a cascaded array.

Figure 6:
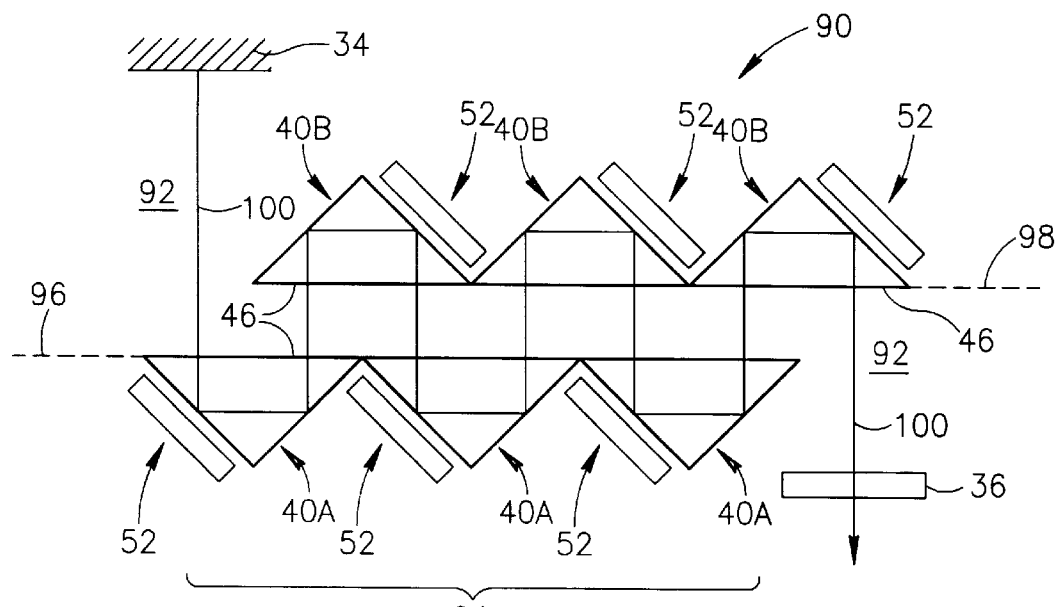
FIG. 6 is a plan view schematically illustrating a fifth preferred embodiment of a slab laser in accordance with the present invention including six triangular prismatic slabs of gain-medium optically pumped by diode-laser bars with slabs grouped in two rows of three with entrance faces thereof oriented parallel to each other.

Referring now to FIG. 6, a fifth embodiment 90 of a laser in accordance with the present invention includes a resonator 92 terminated by a maximally-reflecting mirror 34 and an output-coupling mirror 36. A gain-region 94 includes three prismatic slabs 40A of gain-medium arranged end-to-end and having hypotenuse faces 46 thereof aligned with each other in a plane 96. Gain-region 94 also includes three prismatic slabs 40B of gain-medium arranged end-to-end and having hypotenuse faces 46 thereof aligned with each other in a plane 98. Each of slabs 40A and 40B has the same dimensions. Slabs 40B are arranged such that hypotenuse faces 46 thereof face hypotenuse faces 46 of slabs 40A; are spaced apart and parallel to hypotenuse faces 46 of slabs 40A. The axes-of-symmetry of corresponding slabs 40A and 40B (not shown in FIG. 6) are offset from each other by about one-half the length of a hypotenuse face. The slabs are optically-pumped by diode-laser bars 52.

Resonator 92 is arranged such that laser-light circulating therein follows a convoluted path 100 through gain-region 94. The convoluted path enters an end one of slabs 40A at normal incidence to hypotenuse face 46 thereof, undergoes two ninety-degree reflections in each of slabs 40A and 40B, and exits an opposite-end one of slabs 40B at normal incidence to hypotenuse face 46 thereof.

It should be noted here that, while in laser 90 circulating laser-light undergoes only two ninety-degree reflections in each slab 40, the number of reflections in each slab may be increased by reducing the symmetry-axis offset of corresponding slabs. Laser 90 exemplifies in particular how a laser in accordance with the present invention can provide an extended optical path through a gain-medium without a limit to the extent of the optical path therein being imposed by availability of a boule of gain-medium of sufficient dimension or optical quality to fabricate a single slab of sufficient length to accommodate the extended optical path.

Figure 6A:
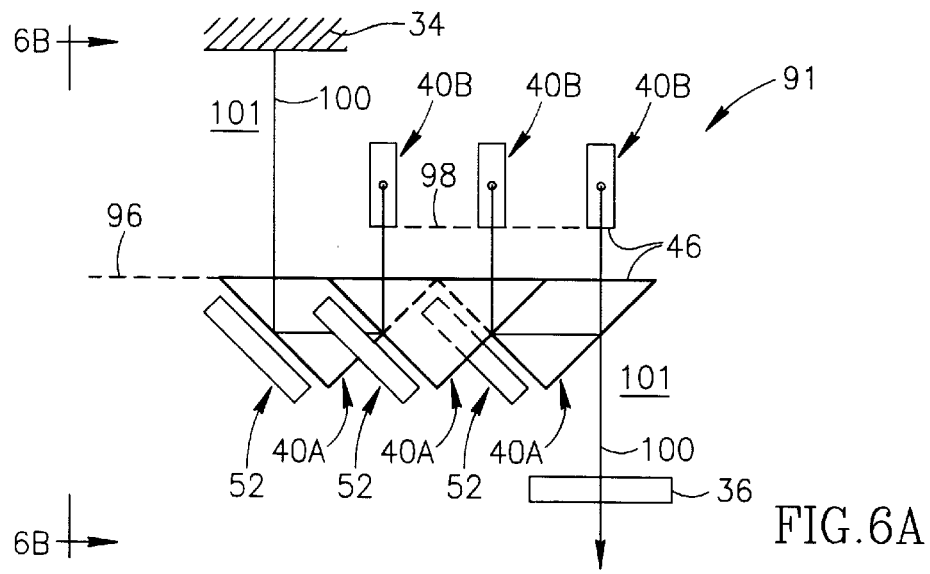
FIG. 6A is a plan view schematically illustrating a variation of the preferred embodiment of FIG. 6 in which entrance faces of slabs in one row thereof are oriented perpendicular to the entrance faces of slabs in the other row.
Figure 6B:
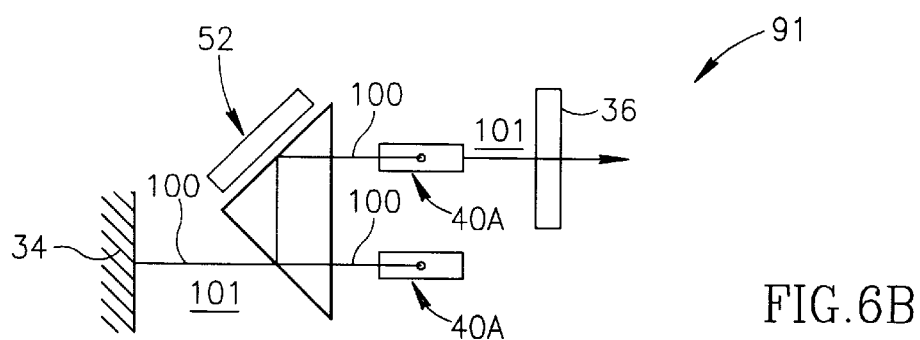
FIG. 6B is an elevation view seen generally in the direction 6B—6B of FIG. 6A.

Referring now to FIGS. 6A and 6B a variation 91 of the laser of FIG. 6 is depicted. Laser 91 includes the same number of prismatic slabs in two rows of three (three slabs 40A and three slabs 40B) with elongated entrance faces of prisms 40B arranged in a plane 98 parallel to plane 96. Prismatic slabs 40B, however, are oriented perpendicular to slabs 40A, this perpendicular orientation requiring that slabs 40A be arranged in an overlapping manner with one at a higher level than the other two. Adjacent ones of the prismatic slabs 40 being oriented perpendicular to each other as depicted, provides that one thereof changes the direction of path 100 by about 180-degrees in a first plane and the other thereof changes the direction of path 100 by about 180-degrees in a second plane perpendicular to the first plane.

A particular advantage of the arrangement of laser 91 is that, if all slabs are cooled as discussed above by contact-cooling their triangular faces, any cylindrical thermal-lens effect introduced in one prismatic slab 40A is converted to a spherical thermal-lens effect by a similar but perpendicularly-oriented thermal-lens effect in a prismatic slab 40B that is next in the direction of propagation of laser light along path 100. With equal numbers of prismatic slabs 40A and 40B the net thermal lensing effect will be a spherical (stigmatic) thermal lensing effect, similar to that exhibit by gain-medium rods in resonators employing such rods. This stigmatic thermal-lensing effect can be compensated, as is known in the art by an appropriate selection of specifications for resonator mirrors or by inclusion of one or more refractive lens elements in the resonator.

Figure 7:
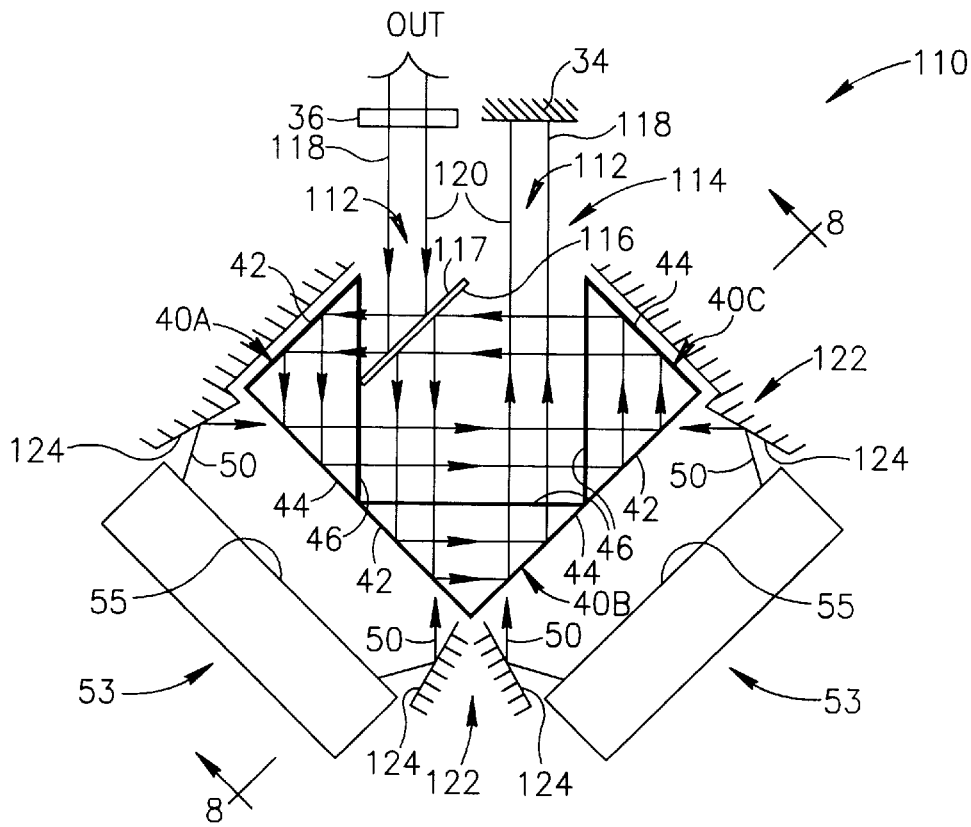
FIG. 7 is a plan view schematically illustrating a sixth preferred embodiment of a slab laser in accordance with the present invention having a gain-region including three triangular prismatic slabs of gain-medium optically pumped by diode-laser bar arrays via tapered optical-waveguides.
Figure 7A:
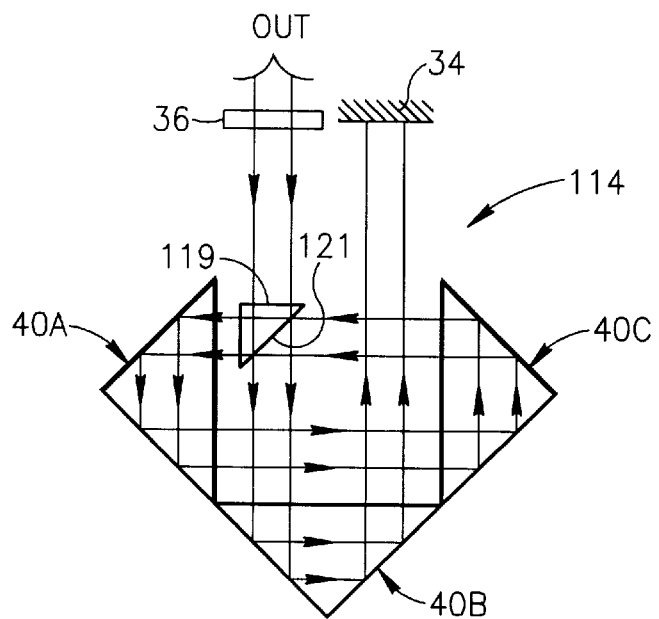
FIG. 7A is a plan view schematically illustrating an alternative configuration of the gain-region of the laser of FIG. 7
Figure 8:
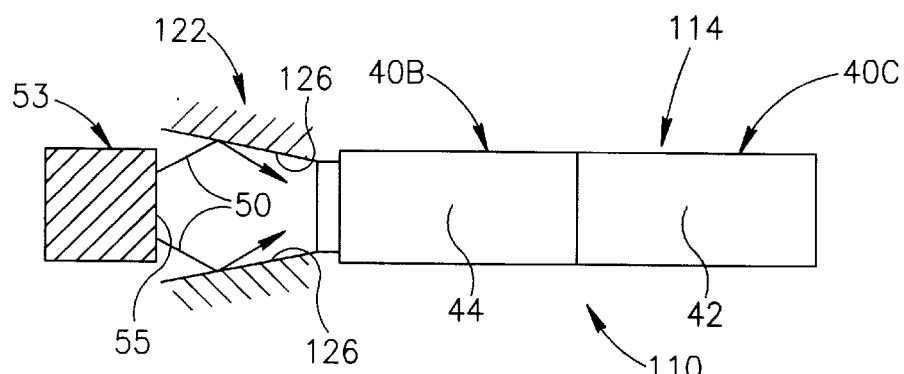
FIG. 8 is a cross-section view seen generally in the direction 8—8 of FIG. 7 schematically illustrating details of a diode-laser bar array and associated optical-waveguide in the laser of FIG. 7.

Referring now to FIGS. 7, 7A and 8, a sixth embodiment 110 of a laser in accordance with the present invention is illustrated. Laser 110 includes a resonator 112 terminated by a maximally reflecting mirror 34 and an output-coupling mirror 36. Laser 112 includes a gain-region 114. Gain-region 114 includes three triangular prismatic slabs of gain-medium 40, here designated individually as slabs 40A, 40B and 40C. Slabs 40A, 40B and 40C are arranged with hypotenuse faces 46 thereof defining three sides of a square. Faces 46 of slabs 40A and 40C are aligned with each other, face-to-face and spaced apart from each other. Face 46 of slab 40B is perpendicular to faces 46 of slabs 40A and 40C and externally faces the space between slabs 40A and 40C. A mirror 116 coated for maximum reflection of laser-light is located proximate face 46 of slab 40A and has a face 117, reflective for laser-light, inclined at 45 degrees thereto.

A beam of laser-light circulating in resonator 112 is designated in FIG. 7 by extreme rays 118 and 120. In one direction of travel, laser-light circulating in resonator 112 leaves output-coupling mirror 36, is reflected at ninety degrees from reflective face 117 of mirror 116 and enters slab 40A via hypotenuse face 46 thereof at normal incidence thereto. The laser-light exits face 46 of slab 40A after undergoing successive ninety-degree reflections due to TIR at respectively faces 42 and 44 thereof. After exiting slab 40A, the laser-light then enters slab 40C through hypotenuse face 46 thereof at normal incidence thereto. The laser-light exits face 46 of slab 40C after undergoing successive ninety-degree reflections due to TIR at respectively faces 42 and 44 thereof.

After exiting slab 40C, the laser-light is again reflected at ninety degrees from mirror 116 then enters slab 40B via hypotenuse face 46 thereof at normal incidence thereto. The laser-light exits face 46 of slab 40B after undergoing successive ninety-degree reflections due to TIR at respectively faces 42 and 44 thereof and then proceeds to maximally reflecting mirror 34 in a direction parallel to the direction in which it left mirror 36. Those skilled in the art will recognize that after striking mirror 34, the laser-light will return to mirror 36 in the reverse direction along the above-described path. Only one direction of travel for laser-light is depicted in FIG. 7 for clarity.

In FIG. 7, mirror 116 is illustrated as a plane mirror of finite thickness and may be reflective for laser-light on one or both surfaces thereof. As depicted in FIG. 7A, mirror 116 of gain region 114 is replaced by a forty-five degree prism 119 arranged with its hypotenuse face 121 at forty-five degrees to hypotenuse face 46 of slab 40A and coated for maximum reflection for laser-light.

Laser 110 has an advantage in that the arrangement of gain-region 114 allows for a particularly compact laser. The laser is preferably pumped by two-dimensional (stacked diode-laser bar) arrays 53 having emitting faces 55. In such arrays diode-laser bars are "stacked" one above the other such that in emitting faces there is a two dimensional array of individual diode-laser emitters. Pump-light 50 from the individual emitters of each diode-laser bar array 53 (only extreme rays shown in FIGS. 7 and 8) is concentrated by tapered optical-waveguides 122 having interior surfaces 124 and 126 which are made highly reflective for the pump-light.

It is pointed out here that, in any of the above-described embodiments of lasers in accordance with the present invention, there is some flexibility in selecting spacing of hypotenuse (entrance-exit faces). It is clear from consideration of lasers 30 and 60 (see FIGS. 1 and 3) for example that path of laser-light within gain-medium slabs 40A and 40B does not depend on the parallel separation of hypotenuse faces 46 of the slabs. Depending on the selection of specifications for resonator mirrors 34 and 36, there may be some dependence of mode (beam) diameter on slab separation.

Figure 9:
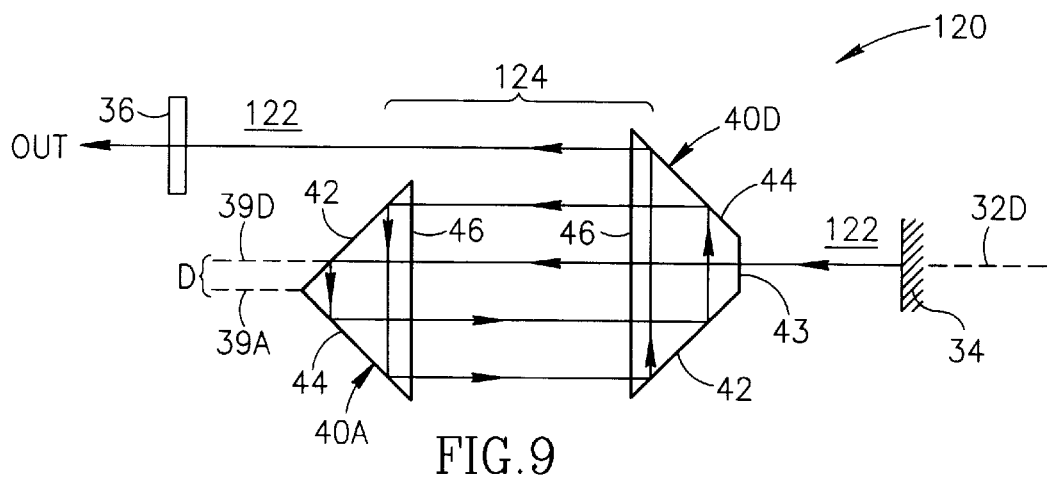
FIG. 9 is a plan view schematically illustrating a seventh preferred embodiment of a slab laser in accordance with the present invention including two triangular prismatic slabs of gain-medium one thereof being larger than the other and truncated at the apex thereof to provide an entrance-exit face for laser-light.

Referring now to FIG. 9, a seventh embodiment 120 of a slab laser in accordance with the present invention is illustrated. Laser 120 includes a resonator 122 terminated by maximally reflecting mirror 34 and output-coupling mirror 36. Within resonator 122 is a gain-region 124 including prismatic slabs of gain-medium 40A and 40D. Slab 40A is specified as in other embodiments of the inventive lasers described above. Slab 40D is of the same general form of slab 40A, inasmuch as it includes reflective faces 42 and 44 subtending the 90 degree angle, and has a hypotenuse face 46 within the angular subtense and at forty-five degrees to faces 42 and 44 of the slab. Slab 40D, however, is bigger than slab 40A and is truncated at its apex to form an entrance-exit face 43, which may be described as separating faces 42 and 44. Entrance-exit face 43 is parallel to hypotenuse face 46, i.e., at 45 degrees to reflecting faces 42 and 44 of slab 40D. Slab 40D has an axis-of-symmetry 39D which, as in above-described, exactly-triangular slabs 40A and 40B, bisects the angle between the reflecting faces and is perpendicular to hypotenuse face 46.

Slabs 40A and 40D are arranged with hypotenuse faces 46 thereof aligned face-to-face and parallel with each other. Slab 40A is arranged with its axis-of-symmetry 39A offset by a distance D from axis-of-symmetry 39D of slab 40D. Slabs 40A and 40D are pumped by diode-laser arrays as described above in other embodiments of the inventive lasers. The diode-laser arrays have been omitted from FIG. 9 for clarity.

In one direction of circulation in resonator 122, laser-light leaving maximally reflecting mirror 34 enters slab 40D via entrance-face 43 thereof at normal incidence thereto. The laser-light passes directly through slab 40D, exiting the slab via hypotenuse face 46 thereof at normal incidence thereto. The laser-light then enters slab 40A via hypotenuse face 46 thereof at normal incidence thereto. The laser-light then undergoes two successive ninety-degree reflections in slab 40A, two successive ninety-degree reflections in slab 40D, a further two successive ninety-degree reflections in slab 40A, and a further two successive ninety-degree reflections in slab 40D, before finally exiting slab 40D via hypotenuse face 46 thereof at normal incidence thereto. After exiting slab 40D, the laser-light proceeds to output-coupling mirror 36. Laser-light reflected from output coupling mirror 36 returns along the instantly-described path in the reverse direction.

One advantage of the arrangement of laser 120 is that the truncation of slab 40D minimizes a possibility of a spurious laser-mode being formed by retroreflective "trapping" of laser-light by a pointed apex of the slab. Another advantage is that a certain decree of lateral compactness of the laser, compared, for example, with laser 30, is afforded by directing laser-light into gain-region 124 via face 43 of slab 40D.

Figure 10:
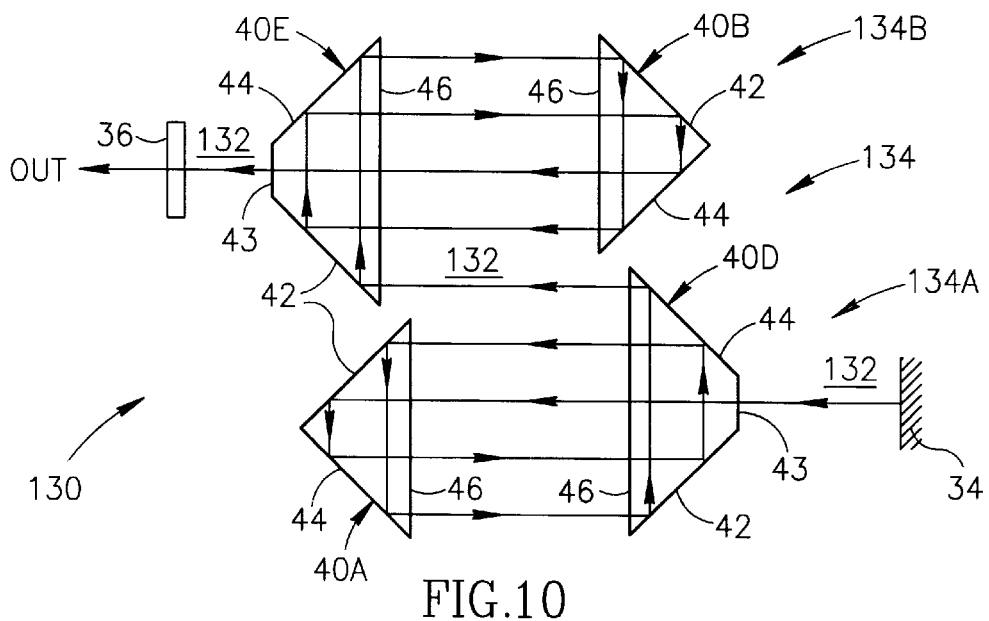
FIG. 10 is a plan view schematically illustrating an eighth preferred embodiment of a slab laser in accordance with the present invention including four triangular prismatic slabs of gain-medium two thereof being larger than the others and truncated at the apex thereof to provide an entrance-exit face for laser-light.

Referring now to FIG. 10, an eighth embodiment 130 of a slab laser in accordance with the present invention is illustrated. Laser 130 includes a resonator 132 formed between maximally reflecting mirror 34 and output-coupling mirror 36. Within resonator 132 is a gain-region 134. Gain-region 134 includes first and second portions 134A and 134B each thereof including a slab 40A of gain-medium and a slab 40D of gain-medium. Gain-region portion 134A is essentially identical with gain-region 124 of above-described laser 120. Laser-light leaving maximally reflecting mirror 34 proceeds through gain-region 134 in the same manner as described above for gain-region 124.

Gain-region portion 134B is essentially a duplicate off gain-region portion 134A arranged in reverse order. Faces 46 of all slabs in gain-region 134 are all essentially parallel to each other. Slabs 40A and 40D are diode-laser pumped as described above in other embodiments of the inventive lasers.

Gain-region portion 134B is arranged such that laser-light exiting gain-region portion 134A via hypotenuse face 46 of slab 40D of the gain-region portion, enters slab 40D of gain-region portion 134B via hypotenuse face 46 of the slab. Thereafter, the laser-light undergoes successive ninety-degree reflections in slab 40D, successive ninety-degree reflections in slab 40A, a further two successive ninety-degree reflections in slab 40D, and a further two successive reflections in slab 40A. After exiting face 46 of slab 40A, the laser-light passes through slab 40D via faces 46 and 43 thereof and proceeds to output coupling mirror 36. Laser-light reflected from output-coupling mirror 36 returns to maximally reflecting mirror 34 along the instantly-described path in the opposite direction.

Those skilled in the art to which the present invention pertains will recognize that the above-described embodiments of the inventive lasers describe merely a fraction of the possible combinations of prismatic slabs of gain-medium in a slab laser in accordance with the present invention. Those skilled in the art may devise many other combinations of prismatic slabs of gain-medium without departing from the spirit and scope of the present invention.

It is emphasized here that a particularly attractive advantage of a slab laser in accordance with the present invention lies in that a gain-region affording an extended path for laser-light in a gain-medium may be formed from two or more relatively inexpensive prismatic slabs of the gain-medium. In each of the above described slabs 40 a precise control of angular relationship is important only between reflecting faces 42 and 44 of the slabs. Further the precision of control required is relatively modest, for example, less than about 3.0 arc minutes. This precision is typical for mass produced prisms available from commercial suppliers. The angular relationship of faces 46 with faces 42 and 44 may be controlled with an order of magnitude less precision. This also implies a relatively relaxed tolerance on parallelism of faces 46 in face-to-face combinations of slabs. This, in turn, permits relative ease of alignment of slabs with each other, and relative ease of alignment of a resonator including the slabs. Angular errors in individual prismatic slabs can be canceled by sequentially aligning the slabs using suitable tooling fixtures.

Figure 5A:
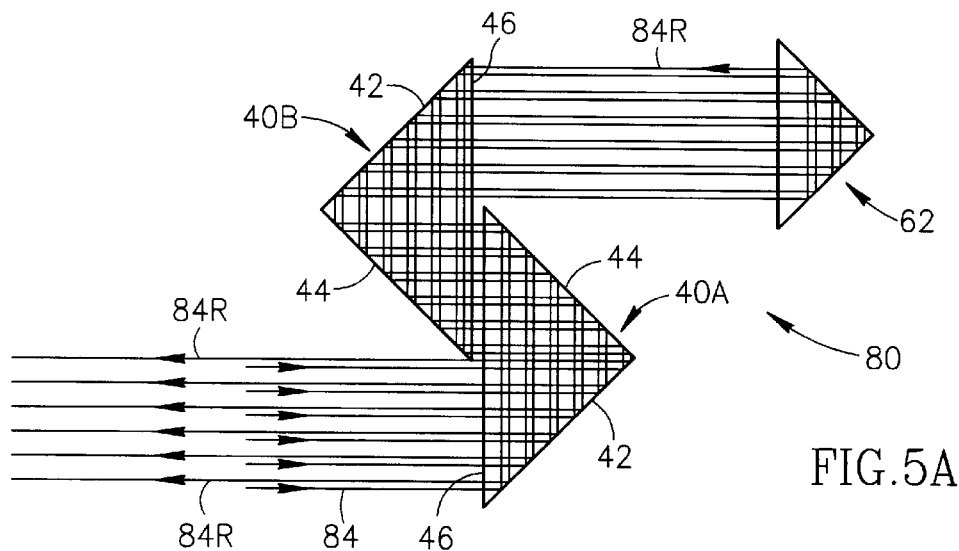
FIGS. 5A, 5B and 5C illustrate the effect of angular error in the formation of a prismatic slab and the correction of that error as applied to the fourth embodiment shown in FIG. 5.
Figure 5B:
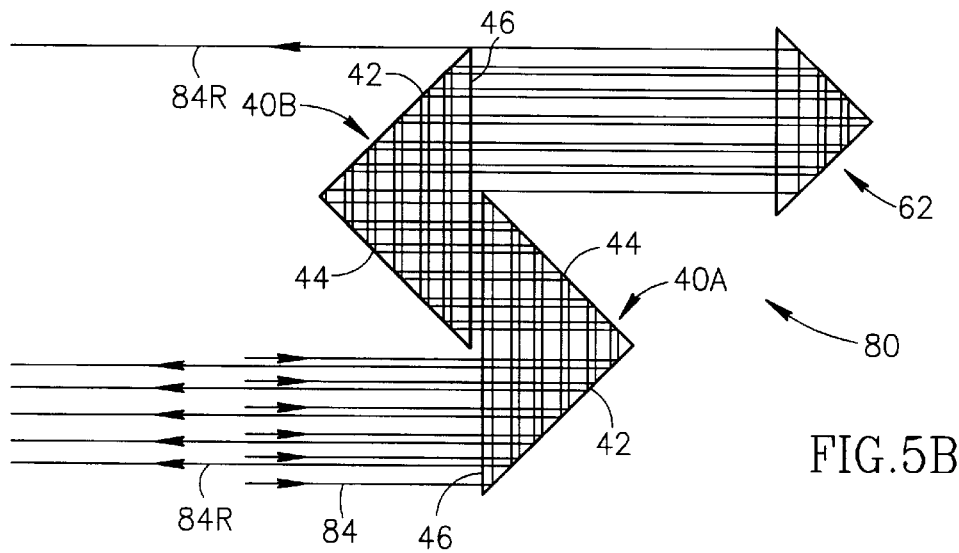
Figure 5C:
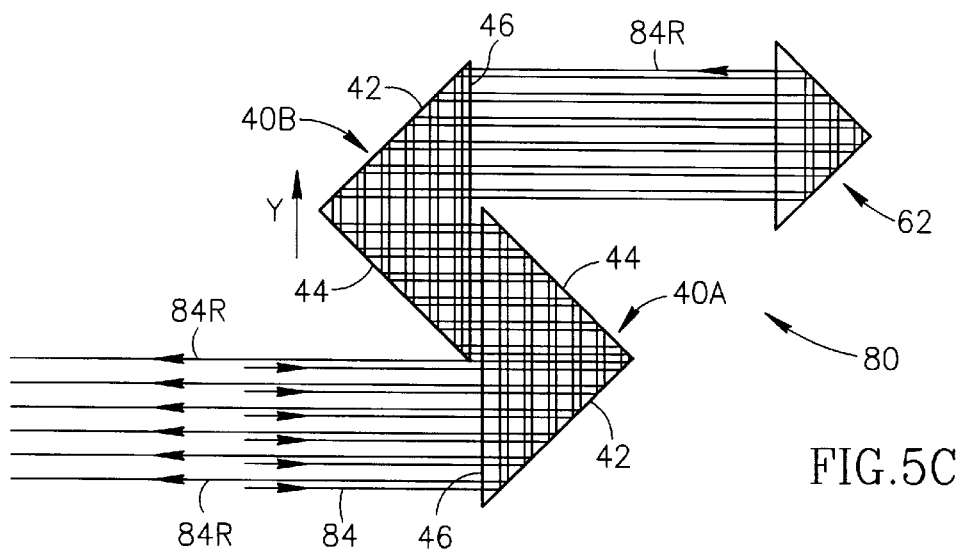

By way of example FIGS. 5A–C depict results of an angular error analysis and correction thereof in a laser 80 of FIG. 5. This analysis is performed by tracing six equispaced parallel rays 84 through gain-medium slabs 40A and 40B. Rays 84 returning from a reflecting prism 62 are designated rays 84R. Prismatic slabs 40A and 40B are each assumed to have a hypotenuse length (entrance-exit face 46) of 4.5 mm with the axes of symmetry of the slabs laterally displaced by 14.0 mm. FIG. 5A depicts a situation both slabs 40A and 40B have an angle of exactly 90.0° between reflecting faces 42 and 44 thereof. All rays 84R return through prismatic slabs 40A and 40B on a path parallel to rays 84.

FIG. 5B depicts a situation wherein prismatic slabs 40A and 40B have the same displacement of their axes of symmetry but wherein prismatic slabs 40A and 40B have angles between reflective faces 42 and 44 thereof of respectively 90.0830° and 89.917°, corresponding to an additive error of 5' of arc. Here it can be seen that as a result of this angular error, of the six "outgoing" rays 84 only five rays 84R return, as one ray 84R reflected from prism 62 strays past prismatic slab 40B instead of entering the slab via face 46 thereof.

FIG. 5C depicts a situation including the 90.083° and 89.917° prismatic slabs 40A and 40B of FIG. 58 but wherein prismatic slab 40B is displaced from prismatic slab 40A by a further 0.1 mm in a direction Y parallel to entrance faces 46 of the slab. This additional displacement is sufficient to recapture the "stray" ray 84R while still maintaining all other rays within prismatic slabs 40A and 40B.

By way of comparison in a prior-art slab laser in which laser-light follows a zig-zag path between opposite parallel faces of slab of gain-medium, the sides of the slab may be required to be parallel to within about thirty seconds (±30") of arc. There is no external means of correcting any error in excess of the required precision. This greatly increases the manufacturing cost and places corresponding requirements on the optical quality (homogeneity) of the slab material.

The need to control precisely, in manufacturing, only reflecting faces 42 of the slabs, combined with the relatively smaller blank cost reduces the overall cost (manufacturing plus material) of each slab. It is believed that two slabs 40 of gain-medium in accordance with the present invention can be provided for substantially less than the cost of a single prior-art monolithic slab capable of providing the same path-length for laser-light in the gain-medium. By way of example, the cost of an array of prismatic slabs may be from two to five times less than the cost of a monolithic slab depending on the size and aspect ratio of the monolithic slab. Generally the bigger the slab the greater will be the cost difference.

In above-described embodiments of slab lasers in accordance with the present invention, two different variations of a triangular prismatic gain-medium slab 40 are described. One thereof, for example slab 40A of FIG. 1, is in the form of a perfectly triangular prism having only three peripheral faces. Another thereof, for example, slab 40D of FIG. 9, is truncated at its apex to provide an entrance-exit face 43. Those skilled in the art to which the present invention pertains will recognize that the above-described forms of slabs 40 are not the only forms of such slabs which fall within the spirit and scope of the present invention. A description of examples of alternative forms of slabs 40, usable in above described and other embodiments of slab lasers in accordance with the present invention, is set forth below with reference to FIGS. 11, 12, and 13.

Figure 11:
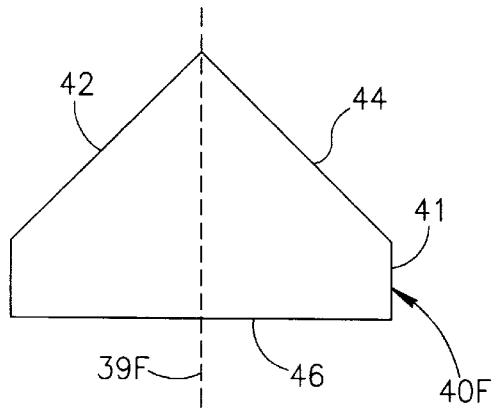
FIG. 11 is a plan view schematically illustrating one alternative form of triangular prismatic gain-medium slab in accordance with the present invention.

In FIG. 11, a slab 40F is depicted which has its "hypotenuse-corners" truncated forming faces 41 thereon. This may be done simply to remove two otherwise-sharp corners from the slab, to avoid potential difficulties in manufacturing, or to extend the distance of hypotenuse face 46 of the slab from reflective faces 42 and 44 thereof to provide a longer path-length in the gain-medium. Slab 40F has an axis-of-symmetry 39F. It should be noted here that as faces 41 have no particular reflective or transmissive function, faces 41 need not be at a right-angle to face 46, as illustrated.

Figure 12:
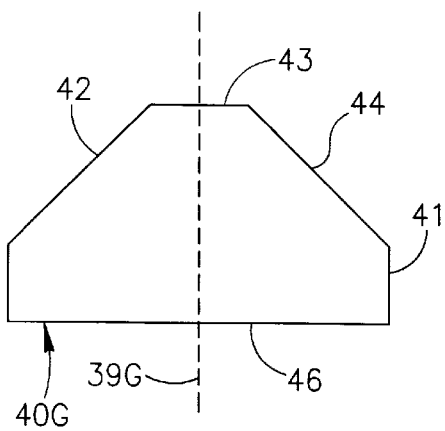
FIG. 12 is a plan view schematically illustrating another alternative form of triangular prismatic gain-medium slab in accordance with the present invention.

In FIG. 12, a slab 40G is depicted which has the truncated hypotenuse-corners of slab 40F and, additionally, has its apex-corner truncated to form an entrance-exit face 43, the utility of which in reducing the possibility of spurious-mode formation is described above with reference to laser 120 of FIG. 9. Slab 40G has an (optical) axis-of-symmetry 39G.

It is pointed out here that slabs 40, in any of the above-described peripheral forms, will be least expensive to manufacture, and most convenient to arrange, if they are physically symmetrical about optical axis-of-symmetry 39, in which case reflecting faces 42 and 44 thereof will be of equal length. Where hypotenuse-corners are differently truncated, for one reason or another, reflecting faces 42 and 44 can be of different length while the slabs, in the context of the present invention remain optically symmetrical. In any form of the inventive slabs, the length of hypotenuse face 46 thereof will always be longer than the longest of reflective faces 42 and 46, and a second entrance-exit face 43 will always be shorter than the shortest of reflective faces 42 and 46.

Figure 13:
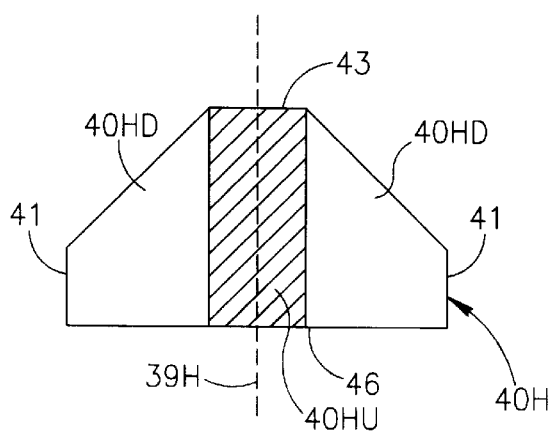
FIG. 13 is a plan view schematically illustrating yet another alternative form of triangular prismatic gain-medium slab in accordance with the present invention.

Continuing now with a discussion of alternative forms of slabs 40, in FIG. 13, a slab 40H, having an axis-of-symmetry 39H, is depicted which is of the same form as slab 40G of FIG. 12, but which is formed by assembling, for example by diffusion-bonding, to pentagonal prismatic portions 40HD and one rectangular prismatic portion 40HU. Pentagonal prismatic portions 40HD are formed from a doped crystalline host, such as neodymium-doped YAG (Nd:YAG) and provide optical gain when appropriately optically-pumped. Rectangular prismatic portion 40HU is formed from undoped YAG and provides no optical gain. As doped and undoped portions 40HD and 40HU have essentially the same refractive index, there is negligible, is any, optical loss at junctions between the doped and undoped portions. This arrangement can further reduce the possibility of spurious-mode formation by retroreflective trapping within the slab.

Figure 14:
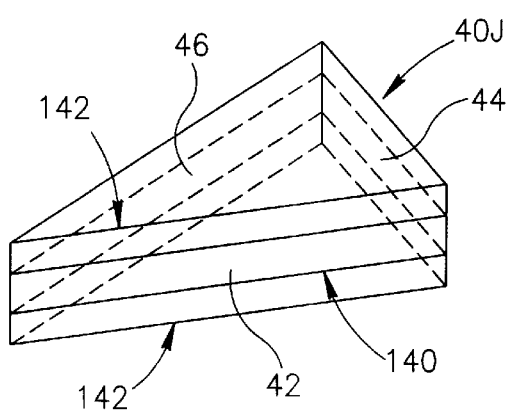
FIG. 14 is a perspective view schematically illustrating still another alternative form of prismatic gain-medium slab in accordance with the present invention.

Referring now to FIG. 14, still another form 40J of triangular prismatic slab of gain-medium in accordance with the present invention is illustrated. Slab 40J includes a central triangular portion 140 which is formed from a gain-medium. Portion 140 is clad on each side thereof by another portion 142 of a material which is transparent to both pump-light and laser-light and has a lower refractive index than the gain-medium. An effect of this arrangement of slab 40J is to form a planar optical-waveguide which confines pump-light in the gain-medium. It should be noted here that while a clad form of gain-medium slab in accordance with the present invention is described in terms of an exactly-triangular prison, any of the other above-described forms of slab may include such cladding.

Figure 15:
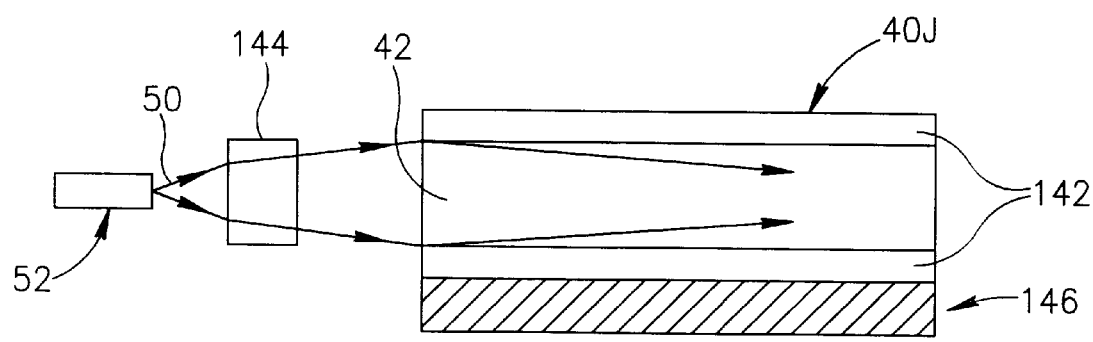
FIG. 15 is an elevation view schematically illustrating the gain-medium slab of FIG. 14 laterally optically-pumped by pump-light from a diode-laser are having divergence reduced by a hemicylindrical lens.

In FIG. 15, a slab 40J is depicted as being pumped through a laser-light-reflecting face 42 thereof by pump-light 50 from a diode-laser bar 52. Pump-light 50 has its fast-axis divergence reduced by a hemicylindrical lens 144. By way of example, an Nd:YAG gain-medium has a refractive index of about 1.82. Using sapphire (which has a refractive index of about 1.77) as a cladding material waveguide action for pump-light would occur for light incident on face 42 at an angle less than about 25.0 degrees. A lens of relatively low dioptric power is sufficient to reduce the fast-axis divergence of a diode-laser bar to within ±25.0 degrees.

An advantage of using sapphire as a cladding material is that it has a relatively high (compared with YAG) thermal conductivity. This allows heat resulting from pump-light absorption in the gain-medium to be rapidly conducted away from the gain-medium into cooling members 146 in thermal contact with cladding portions 142 of slab 40J.

In all above-described embodiments of lasers in accordance with the present invention, prismatic slabs of gain-medium are in the form of forty-five degree prisms, with laser light entering and exiting the slabs through the hypotenuse face and a ninety degree (TIR) reflection at each of the perpendicular faces, thereby changing the direction of propagation of the laser light by one-hundred-eighty degrees. One other prism form which can provide a one-hundred-eighty degree change of direction for light incident thereon is referred to by practitioners of the art as a "Brewster's mirror". This is a prism of an isosceles-triangular form with two equal-length faces inclined at Brewster's angle (for the material of the prism) to a base face. If the refractive index of the prism material is 1.839 or greater (Brewster's angle 61.46° or greater) it is possible for light to enter one of the equal-length faces at an angle of incident thereto equal to Brewster's angle, undergo a total internal reflection at the base face, and exit the opposite equal-length faces (isosceles faces) at an angle of incidence thereto equal to Brewster's angle, thereby providing a one-hundred-eighty degree change of direction for light incident on the Brewster's mirror.

Figure 16:
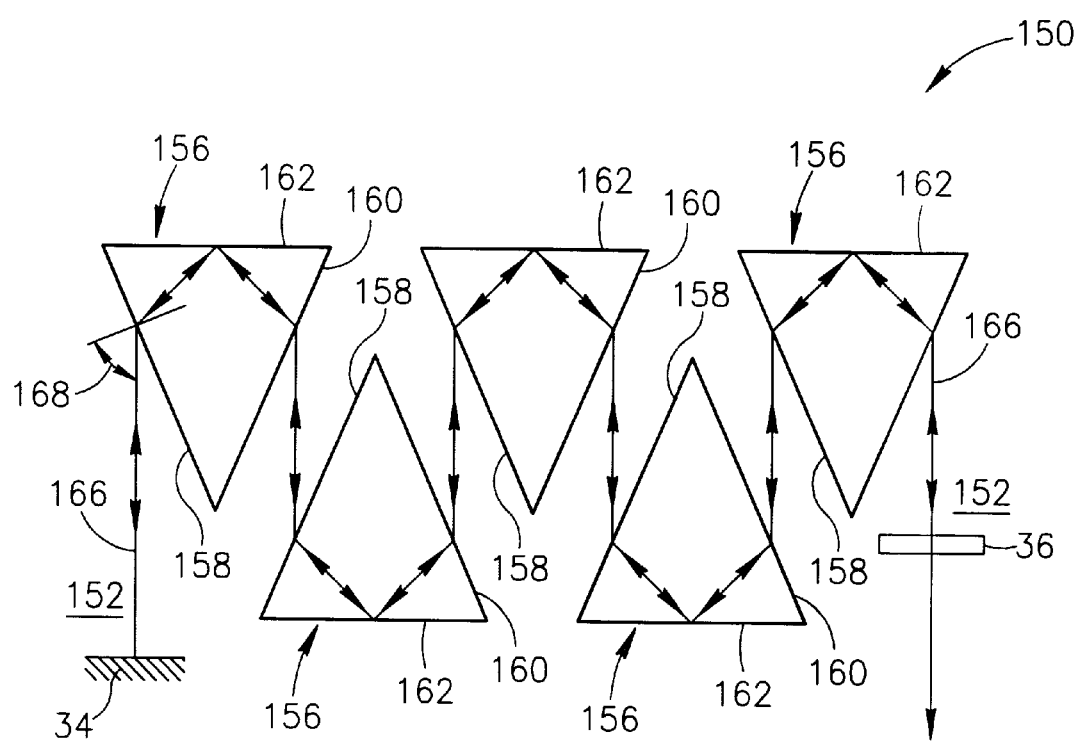
FIG. 16 is a plan view schematically illustrating a ninth preferred embodiment of a slab laser in accordance with the present invention including six triangular prismatic slabs of gain-medium optically pumped by diode-laser bars with slabs grouped in two rows of three with entrance/exit faces thereof oriented parallel to each other with laser light entering or exiting an entrance-exit face at Brewster's angle for the material of the slab.

Referring now to FIG. 16, a ninth embodiment 150 of a laser in accordance with the present invention, including a plurality of such Brewster's mirrors made from a solid-state gain-medium is depicted. One suitable gain-medium is neodymium-doped yttrium orthoaluminate (Nd:YALO) which has a refractive index of about 1.9. Laser 150 has a laser resonator 152 formed between a maximally-reflecting mirror 34 and a partially-transmitting output coupling mirror 36. A gain region 154 includes five isosceles-triangular prismatic slabs of a solid-state gain-medium having a refractive index of about 1.839 or greater. The prismatic slabs have two isosceles faces 158 and 160 and a base face 162. The term isosceles-triangular, here again, is used generally and does not be construed as precluding truncation of one or more corners of a slab for reasons, such as those discussed above with reference to FIGS. 11–13.

The prisms are arranged side-by-side in a staggered row, with adjacent ones thereof oppositely oriented such with an isosceles face 158 of one slab is parallel to isosceles face 160 of an adjacent oppositely-oriented slab. The slabs are arranged with respect to mirrors 34 and 36 such that laser light circulating in resonator 152 follows a convoluted path 166 sequentially through adjacent prismatic slabs 156 entering a slab via one isosceles face thereof at Brewster's angle (angle 168) thereto, being reflected by TIR from base face 162 thereof, and exiting the prismatic slab via the other isosceles face thereof at Brewster's angle (angle 168) thereto. The arrangement of laser 150 has an advantage of the arrangement of laser 90 of FIG. 6 inasmuch as a more compact arrangement of prismatic slabs is possible for the same path-length in a the same solid-state gain-medium. Further, the particular form of Brewster's mirror slabs 156 provides for a greater fill factor than slabs 40 of laser 90. A disadvantage, of course, is the restricted range of gain-media from which slabs 156 can be made, due to the high refractive index requirement.

Continuing now with a general discussion of solid-state gain-media suitable for lasers in accordance with the present invention, with the exception of laser 150. Lasers in accordance with the present invention may be used with a wide range of solid-state gain-media. These include: neodymium-doped YAG (Nd:YAG); erbium-doped YAG (Er:YAG); ytterbium-doped YAG (Yb:YAG); thulium-doped YAG (Tm:YAG); thulium, holmium-doped YAG (Tm:Ho:YAG) chromium,thulium,holmium-doped YAG (CTH:YAG); chromium-doped YAG (YAG:Cr$^{+4}$); erbium-doped yttrium scandium gallium garnet (Er:YSGG); neodymium, chromium-doped YSGG (Nd:Cr:YSGG); erbium, chromium-doped YSGG (Er:Cr:YSGG); neodymium-doped yttrium lithium fluoride (Nd:YLF); erbium-doped YLF (Er:YLF); holmium-doped YLF (Ho:YLF); thulium-doped YLF (Tm:YLF); neodymium-doped yttrium orthovanadate (Nd:YVO$_4$); neodymium-doped potassium gadolinium tungstate (Nd:KGW); erbium-doped KGW (Er:KGW); Nd:YALO; erbium-doped YALO (Er:YALO); thulium-doped YALO (Tm:YALO); neodymium-doped phosphate glass; and neodymium-doped silicate glass.

The prismatic slab form of gain-medium, which is a feature of all above described lasers in accordance with the present invention provides a particular benefit in using quasi three-level systems the performance of which improves with decreasing temperature. Such systems include the gain-media Yb:YAG, Tm:YAG, Tm:Ho:YAG, CTH-YAG, Ho:YLF, Tm:YLF, and Tm:YALO.

A prismatic gain-medium slab in accordance with the present invention can be readily reduced to temperatures below 0° C., for example by sandwiching the slab between cold plates, chilled by a cryogen or the like, with thermal contact improved by placing indium foil between the slab and the cold plates. Lowering the temperature of the prismatic slabs also reduces above described thermal-lensing effects as well as reducing thermal-birefringence. This is because the thermal conductivity of these three-level materials increases as the temperature decreases.

The improved fill factor of the inventive prismatic gain-medium slabs is also of advantage with three-level systems. These materials absorb light at the lasing wavelength unless they are optically pumped. Some minimum pump light fluence is required to pump the material to transparency. This is dependent on pump-light photon energy, doping ion density, and the population of upper and lower excited-state levels. Unpumped volume of the gain-medium acts as an absorber or energy sink. If the laser mode does not have a good overlap with the pumped volume either pump-light energy is wasted or laser-energy is lost. In a prismatic gain-medium slab in accordance with the present invention, optically pumped as described above, most of the slab is pumped to transparency and only a relatively small amount of the pumped volume is not used by the laser mode.

Any laser in accordance with the present invention includes at least two prismatic slabs of gain-medium. This can be useful in taking advantage of certain benefits offered by using two different gain-media in a laser resonator.

One such advantage peculiar to continuously-pumped repetitively-pulsed lasers is that a resonator including two different gain-media can be made to have pulse-repetition-rate-dependent characteristics which are intermediate those of each gain-medium. By way of example Nd:YAG and Nd:YVO$_4$ which each provide gain at a wavelength of about 1064 nm have a maximum product of peak and average power as a function of pulse-repetition rate at respectively about 10.0 and 25.0 Kilohertz (KHz). By including both gain-media in a resonator, individually pumped the pulse-repetition rate at which the maximum product of peak and average power of the resonator can be varied continuously between about 10.0 KHz and 25.0 KHz by selectively pumping the gain-media.

Another advantage is that a resonator including two different gain-media a first of which has a characteristic emission at a desired wavelength but does not have pump-light absorption bands in the 790 to 1000 nm wavelength region of commercial diode-lasers, and a second of which has a characteristic emission wavelength which is selectively absorbed by the first gain-medium and also preferentially absorbs in the diode-laser wavelength range. Examples of such combinations of gain-media include Tm:YALO and Ho:YAG; Tm:YLF and Ho:YAG; and Tm:YALO and Ho:YLF, where, in each combination, the Tm-doped gain-medium is the diode-laser light absorbing gain-medium and the Ho-doped gain-medium provides laser emission at a wavelength of about 2.1 micrometers ($\mu$m). This offers an advantage in efficiency over a co-doped gain-medium such as Tm:Ho:YAG which provides another means of generating the 2.1 $\mu$m wavelength line of holmium.

What is claimed is:

1. A laser, comprising:

a laser-resonator; and a plurality of generally triangular prismatic slabs of a solid-state gain-medium located in said resonator, said prismatic slabs cooperatively arranged such that laser-light circulating in said laser-resonator follows a convoluted path through said prismatic slabs.

2. The laser of claim 1, wherein each of said prismatic slabs changes the direction of said convoluted path at least once by about one-hundred-eighty degrees.

3. The laser of claim 2, wherein each of said prismatic slabs has two reflecting faces and a first entrance-exit face, said reflecting faces subtending an angle of about ninety degrees, and said first entrance-exit face having a length longer than the length of the longest of said reflecting faces, and being arranged facing said reflecting faces within said angular subtense thereof and inclined at about forty-five degrees thereto, and wherein said convoluted path followed by said circulating laser light is folded by about ninety degrees at least once at each of said reflecting faces by reflection therefrom.

4. The laser of claim 3, wherein said convoluted path is folded by about ninety degrees more than once at each of said reflecting faces by reflection therefrom.

5. The laser of claim 3, wherein said convoluted path enters and leaves each of said prismatic slabs at least once through said entrance-exit face at normal incidence thereto.

6. The laser of claim 3, wherein at least one of said prismatic slabs has a second entrance-exit face said second entrance-exit face being located between said first and second reflecting face parallel to said first entrance-exit face, and wherein said convoluted path enters or leaves said prismatic slab at least once via said second entrance-exit face at normal incidence thereto.

7. The laser of claim 2, wherein there are two or more of said prismatic slabs and any two adjacent ones of said plurality of slabs are oriented perpendicular and cooperatively arranged such that one thereof changes the direction of said convoluted path by about 180-degrees in a first plane and the other thereof changes the direction of said convoluted path by about 180-degrees in a second plane perpendicular to said first plane.

8. The laser of claim 2, wherein each of said prismatic slabs is in the form of a Brewster's mirror having two isosceles-faces and a base-face and are arranged such that light enters said prismatic slab by one of said isosceles faces thereof incident at about Brewster's angle thereto and leaves said prismatic slab by the other of said isosceles faces at incident at Brewster'angle thereto.

9. The laser of claim 1, wherein said laser resonator is formed between two mirrors.

10. The laser of claim 1, wherein said laser resonator is formed between a mirror and a prism.

11. The laser of claim 1, wherein each of said prismatic slabs is a slab of the same gain-medium.

12. The laser of claim 1, wherein one of said prismatic slabs is of a different solid-state gain-medium than another prismatic slab.

13. The laser of claim 1, wherein said gain-medium of said prismatic slabs includes one or more gain-media selected from the group of gain-media consisting of Nd:YAG, Er:YAG, Yb:YAG, Tm:YAG, Tm:Ho:YAG, CTH:YAG, $Cr^{+4}$: YAG, Er:YSGG, Nd:Cr:YSGG, Er:Cr:YSGG, Nd:YLF, Er:YLF, Ho:YLF, Tm:YLF, Nd:YVO$_4$, Nd:KGW, Er:KGW, Nd:YALO, Er:YALO, Tm:YALO, neodymium-doped phosphate glass; and neodymium-doped silicate glass.

14. The laser of claim 1, wherein said gain-medium of said prismatic slabs includes one or more gain-media selected from the group of gain-media consisting Yb:YAG, Tm:YAG, Tm:Ho:YAG, CTH-YAG, Ho:YLF, Tm:YLF, and TM:YALO, and wherein said prismatic slabs are cryogenically cooled.

15. A laser, comprising:

a laser-resonator;

a gain-region located in said laser-resonator, said gain-region including at least first and second prismatic slabs, said prismatic slabs including a solid-state gain-medium;

each of said prismatic slabs having two reflecting faces, said reflecting faces subtending an angle of about ninety degrees, and having at least a first entrance-exit face, said first entrance-exit face having a length longer than the length of the longest of said reflecting faces, and being arranged facing said reflecting faces within said angular subtense thereof and inclined at about forty-five degrees thereto; and wherein said prismatic slabs are cooperatively arranged such that laser-light circulating in said laser-resonator follows a first convoluted path through said prismatic slabs, said first convoluted path including a plurality of spaced-apart parallel longitudinal legs, adjacent ones thereof being connected by a corresponding transverse leg at ninety degrees thereto, said longitudinal and transverse legs being inclined at about forty-five degrees to said reflecting faces.

16. The laser of claim 15, wherein said laser-resonator is terminated by first and second mirrors and said laser-light circulating in said resonator circulates between said first and second mirrors, said first and second mirrors being arranged such that said circulating laser-light follows said first convoluted path in opposite directions of travel therebetween.

17. The laser of claim 15, wherein said laser-resonator is terminated by first and second mirrors and said laser-light circulating in said resonator circulates between said first and second mirrors, and wherein a reflective device is positioned at a mid-point in said laser-resonator to reflect said circulating laser-light, said reflective device having first and second reflective surfaces at an angle of forty-five degrees to each other, and said first and second mirrors and said reflective device being arranged such that said circulating laser-light follows said first convoluted path through said prismatic slabs in travelling from said first mirror to said reflective device and follows a second such convoluted path through said prismatic slabs in traveling from said reflective device to said second mirror, said second convoluted path being spaced apart and parallel to said first convoluted path.

18. The laser of claim 17, wherein said reflective device is a prism.

19. The laser of claim 15, wherein said laser-resonator is terminated by a mirror and a reflective device having first and second reflecting surfaces inclined at an angle of forty-five degrees to each other, said mirror and said reflective device being arranged such that said circulating laser-light follows said first convoluted path in traveling from said mirror to said reflective device, and a second such convoluted path in traveling from said reflective device to said mirror, said first and second convoluted paths being overlapping and parallel to each other.

20. The laser of claim 19, wherein said reflective device is a prism.

21. The laser of claim 15, wherein in one direction of travel along said first convoluted path said circulating laser-light enters said gain-region via said first entrance-exit face of said first prismatic slab at normal incidence thereto and leaves said gain-region via said first entrance face of said second prismatic slabs at normal incidence thereto.

22. The laser of claim 15, wherein said first prismatic slab includes a second entrance-exit face, said second entrance-exit face located between said first and second reflecting faces of said first prismatic slab, having a length shorter than the length of the shortest of reflecting faces and being parallel to said first entrance-exit face of said first prismatic slab, and, wherein said circulating laser-light enters said gain-region via said second entrance-exit face of said first prismatic slab at normal incidence thereto and leaves said gain-region via said first entrance face of said first prismatic slabs at normal incidence thereto.

23. The laser of claim 15, wherein said prismatic slabs are optically-pumped by pump-light delivered from a diode-laser array through one of said reflecting faces thereof.

24. The laser of claim 23, wherein at least one of said prismatic slabs is clad on upper and lower opposite lateral faces thereof with a material transparent to said laser-light and said pump-light and having a lower refractive index than the refractive index of said gain-medium.

25. A laser, comprising:
a laser-resonator;
a gain-region located in said laser-resonator, said gain-region including at least first and second prismatic slabs, said prismatic slabs including a solid-state gain-medium;
each of said prismatic slabs having two reflecting faces subtending an angle of about ninety degrees and an entrance-exit face, said entrance-exit face having a length longer than the length of the longest of said reflecting faces, and being arranged facing said reflecting faces within said angular subtense thereof and inclined at about forty-five degrees thereto;
each of said prismatic slabs having an optical axis-of-symmetry bisecting said ninety-degree angle subtended by said reflecting faces and being perpendicular to said entrance-exit face; and
wherein said prismatic slabs are arranged in said laser-resonator with said entrance-exit faces thereof aligned face-to-face and parallel with each other and with said axes-of-symmetry thereof offset from each other by a distance selected such that, in one direction of travel, laser-light circulating in said laser-resonator enters said gain-region via said entrance-exit face of said first prismatic slab at normal incidence thereto, undergoes at least two successive ninety-degree reflections from said reflecting faces in each of said first and second prismatic slabs, and leaves said gain-region via said entrance-exit face of said second prismatic slab at normal incidence thereto.

26. The laser of claim 25, wherein said circulating laser-light in said one direction of travel undergoes only two said ninety-degree reflections in each of said first and second prismatic slabs.

27. A laser, comprising:
a laser-resonator;
a gain-region located in said laser-resonator, said gain-region including first and second prismatic slabs, said prismatic slabs including a solid-state gain-medium;
said first prismatic slab having two reflecting faces subtending an angle of about ninety degrees, and an entrance-exit face, said entrance-exit face having a length longer than the length of the longest of said reflecting faces, and being arranged facing said reflecting faces within said angular subtense thereof and inclined at about forty-five degrees thereto;
said second prismatic slab having two reflecting faces, said reflecting faces being of equal length and subtending an angle of about ninety degrees, and first and second entrance-exit faces;
said first entrance-exit face of said second prismatic slab having a length longer than the length of said reflecting faces and longer than the length of said entrance-exit face of said first prismatic slab, and being arranged facing said reflecting faces within said angular subtense thereof and inclined at forty-five degrees thereto;
said second entrance face of said second prismatic slab separating said reflecting faces thereof, having a length shorter than the length of said reflecting faces, and being parallel to said first entrance-exit face of said second prismatic slab;
each of said prismatic slabs having an axis-of-symmetry bisecting said 90 degree angle subtended by said reflecting faces; and
wherein said prismatic slabs are arranged in said laser-resonator with said entrance-exit faces thereof aligned face-to-face and parallel with each other and with said axes-of-symmetry thereof offset from each other by a distance selected such that, in one direction of travel, laser-light circulating in said laser-resonator enters said gain-region via said second entrance-exit face of said second prismatic slab at normal incidence thereto, undergoes at least two successive 90-degree reflections from said reflecting faces in each of said first and second prismatic slabs, and leaves said gain-region via said first entrance-exit face of said second prismatic slab at normal incidence thereto.

28. A laser, comprising:
a laser-resonator;
a gain-region located in said laser-resonator, said gain-region having first and second portions each thereof including at least first and second prismatic slabs, said prismatic slabs including a solid-state gain-medium;
said first prismatic slab of each of said gain-region portions having two reflecting faces subtending an angle of about ninety degrees, and an entrance-exit face, said entrance-exit face having a length longer than the length of the longest of said reflecting faces, and being arranged facing said reflecting faces within said angular subtense thereof and inclined at about forty-five degrees thereto;
said second prismatic slab of each of said gain-region portions having two reflecting faces, said reflecting faces subtending an angle of about ninety degrees, and first and second entrance-exit faces;
said first entrance-exit face of each of said second prismatic slabs having a length longer than the length of the longest of said reflecting faces and longer than the length of said entrance-exit face of said first prismatic slab, and being arranged facing said reflecting faces within said angular subtense thereof and inclined at about forty-five degrees thereto;
said second entrance face of each of said second prismatic slabs separating said reflecting faces thereof, having a length shorter than the length of the shortest of said reflecting faces, and being parallel to said first entrance-exit face of said second prismatic slab;
each of said prismatic slabs of each of said gain-region portions having an axis-of-symmetry bisecting said ninety-degree angle subtended by said reflecting faces; and
wherein said first and second prismatic slabs in each gain region portion are arranged in said laser-resonator with said entrance-exit faces thereof aligned face-to-face and parallel with each other and with said axes-of-symmetry thereof offset from each other by a distance selected such that, in one direction of travel, laser-light circulating in said laser-resonator enters said first gain-region portion via said second entrance-exit face of said second prismatic slab thereof at normal incidence to said second entrance-exit face, undergoes at least two successive ninety-degree reflections from said reflecting faces in each of said first and second prismatic slabs of said first gain region-portion, leaves said first gain-region portion via said first entrance-exit face of said second prismatic slab thereof at normal incidence thereto, enters said second gain-region portion via said first entrance-exit face of said second prismatic slab thereof at normal incidence to said first entrance-exit face, undergoes at least two successive ninety-degree reflections from said reflecting faces in each of said first and second prismatic slabs of said second gain region-portion, and leaves said second gain-region portion via said second entrance-exit face of said second prismatic slab thereof at normal incidence thereto.

29. A laser, comprising:

a laser-resonator;

a gain-region located in said laser-resonator, said gain-region including first and second pluralities of prismatic slabs, said prismatic slabs including a solid-state gain-medium, and each of said pluralities having the same number of prismatic slabs therein;

each of said prismatic slabs in said pluralities thereof having two reflecting faces, said reflecting faces subtending an angle of ninety degrees and an entrance-exit face, said entrance-exit face facing said reflecting faces within said angular subtense thereof and inclined at about forty-five degrees thereto;

each of said prismatic slabs in said pluralities thereof having an axis-of-symmetry bisecting said ninety-degree angle subtended by said reflecting faces and being perpendicular to said entrance-exit face; and wherein said prismatic slabs of said first plurality thereof are arranged in said laser-resonator with said entrance-exit faces thereof aligned face-to-face and parallel with entrance-exit faces of corresponding prismatic slabs in said second plurality thereof, and with said axes-of-symmetry of said corresponding prismatic slabs offset from each other by a distance selected such that, in one direction of travel, laser-light circulating in said laser-resonator enters said gain-region via said entrance-exit face of an end one of said prismatic slabs in said first plurality thereof at normal incidence to said entrance-exit face, undergoes at least two successive ninety-degree reflections from said reflecting faces in each of said prismatic slabs in each plurality thereof, and leaves said gain-region via said entrance-exit face of said an opposite end one of said prismatic slabs in said second plurality thereof at normal incidence to said entrance-exit face.

30. A laser, comprising:

a laser-resonator;

a gain-region located in said laser-resonator, said gain-region including at first and second and third prismatic slabs of a solid-state gain-medium;

each of said prismatic slabs having two reflecting faces, said reflecting faces subtending an angle of ninety degrees and at least a first entrance-exit face, said first entrance-exit face having a length longer than the length of the longest of said reflecting faces, and being arranged facing said reflecting faces within said angular subtense thereof and inclined at about forty-five degrees thereto;

said first and second prismatic slabs being arranged with said entrance-exit faces thereof aligned face-to-face and parallel with each other defining a space therebetween;

said third prismatic slab being arranged with said entrance-exit face thereof externally facing said space between said entrance-exit faces of said first and second prismatic slabs and perpendicular thereto;

a reflective device located in said space between said entrance-exit faces of said first and second prismatic slabs, said reflective device having at least one reflective surface inclined at about forty-five degrees to said entrance-exit face of said first prismatic slab; and wherein said first, second and third prismatic slabs and said reflective device are cooperatively arranged such that laser-light circulating in said laser-resonator in a one direction of travel enters said gain-region in a first direction at an angle of forty-five degrees to said reflective surface of said reflective device, is reflected at ninety degrees from said reflective device, enters said first prismatic slab via said entrance-exit face thereof at normal incidence thereto, undergoes two successive ninety-degree reflections from said reflecting surface of said first prismatic slab, exits said first prismatic slab via said entrance-exit face thereof at normal incidence thereto, enters said second prismatic slab via said entrance-exit face thereof at normal incidence thereto, undergoes two successive ninety-degree reflections from said reflecting surface of said second prismatic slab, exits said second prismatic slab via said entrance-exit face thereof at normal incidence thereto, is reflected at ninety-degrees by said reflective device, enters said third prismatic slab via said entrance-exit face thereof at normal incidence thereto, undergoes two successive ninety-degree reflections from said reflecting surface of said third prismatic slab, and exits said gain-region via said entrance-exit face of said third prismatic slab in a second direction normal to said entrance-exit face and opposite and parallel to said first direction.

31. The laser of claim 30, wherein said reflective device is a forty-five degree prism and said reflective surface thereof is a hypotenuse face of said prism.

* * * * *